US010750238B1

(12) United States Patent
Ganjam et al.

(10) Patent No.: US 10,750,238 B1
(45) Date of Patent: Aug. 18, 2020

(54) CORRELATING PLAYBACK INFORMATION OF VIDEO SEGMENTS

(71) Applicant: Conviva Inc., Foster City, CA (US)

(72) Inventors: Aditya Ravikumar Ganjam, San Francisco, CA (US); Olivier Wellmann, San Francisco, CA (US); Nandini Iyer, Fremont, CA (US); Haijie Wu, San Mateo, CA (US); Pawas Ranjan, Delhi (IN); Haoshuang Ji, Foster City, CA (US); Swapna Iyer, Cupertino, CA (US); Alban Nicolas, San Mateo, CA (US); Jibin Zhan, Foster City, CA (US)

(73) Assignee: Conviva Inc., Foster City, CA (US)

( * ) Notice: Subject to any disclaimer, the term of this patent is extended or adjusted under 35 U.S.C. 154(b) by 0 days.

(21) Appl. No.: 15/610,341

(22) Filed: May 31, 2017

Related U.S. Application Data

(60) Provisional application No. 62/479,934, filed on Mar. 31, 2017.

(51) Int. Cl.
*H04H 60/33* (2008.01)
*H04H 60/32* (2008.01)
(Continued)

(52) U.S. Cl.
CPC ... *H04N 21/44204* (2013.01); *H04N 21/2353* (2013.01); *H04N 21/2387* (2013.01); *H04N 21/23424* (2013.01); *H04N 21/25808* (2013.01); *H04N 21/4331* (2013.01); *H04N 21/4425* (2013.01); *H04N 21/44209* (2013.01); *H04N 21/44222* (2013.01); *H04N 21/6582* (2013.01); *H04N 21/812* (2013.01);
(Continued)

(58) Field of Classification Search
CPC ....... H04N 21/44204; H04N 21/23424; H04N 21/2353; H04N 21/2387; H04N 21/25808; H04N 21/4331; H04N 21/44209; H04N 21/44222; H04N 21/4425; H04N 21/6582; H04N 21/812; H04N 21/8586
See application file for complete search history.

(56) References Cited

U.S. PATENT DOCUMENTS 9,451,306 B2 9/2016 Sarukkai
9,509,710 B1 11/2016 Barry
(Continued)

OTHER PUBLICATIONS

Ahmed et al., Suffering from Buffering? Detecting QoE Impairments in Live Video Streams, 2017 IEEE 25th International Conference on Network Protocols (ICNP), 2017.
(Continued)

*Primary Examiner* — Kyu Chae
(74) *Attorney, Agent, or Firm* — Van Pelt, Yi & James LLP

(57) ABSTRACT

Correlating information associated with playback of video segments is disclosed. Information associated with playback of a first video segment is obtained. Information associated with playback of a second video segment is obtained. The information associated with playback of the first video segment is correlated with the information associated with playback of the second video segment based at least in part on at least one of a client application identifier, a video session identifier, and a set of timestamps. Output is provided based at least in part on the correlating.

23 Claims, 12 Drawing Sheets

(51) Int. Cl.
*H04N 21/442* (2011.01)
*H04N 21/4425* (2011.01)
*H04N 21/234* (2011.01)
*H04N 21/433* (2011.01)
*H04N 21/258* (2011.01)
*H04N 21/658* (2011.01)
*H04N 21/235* (2011.01)
*H04N 21/858* (2011.01)
*H04N 21/81* (2011.01)
*H04N 21/2387* (2011.01)
*G06Q 30/02* (2012.01)

(52) U.S. Cl.
CPC ..... *H04N 21/8586* (2013.01); *G06Q 30/0242* (2013.01); *H04N 21/25883* (2013.01)

(56) References Cited

U.S. PATENT DOCUMENTS

| | | |
|---|---|---|
| 2003/0187986 A1 | 10/2003 | Sundqvist |
| 2004/0078470 A1* | 4/2004 | Baumeister ....... H04L 29/06027 709/227 |
| 2005/0083844 A1 | 4/2005 | Zhu |
| 2006/0282225 A1 | 12/2006 | Sunshine |
| 2007/0002897 A1 | 1/2007 | Goshen |
| 2007/0263984 A1* | 11/2007 | Sterner ................ G11B 27/034 386/234 |
| 2007/0288518 A1* | 12/2007 | Crigler ................ G06F 16/4387 |
| 2008/0225706 A1 | 9/2008 | Lange |
| 2009/0054074 A1 | 2/2009 | Aaron |
| 2012/0311126 A1 | 12/2012 | Jadallah |
| 2013/0014137 A1* | 1/2013 | Bhatia .................. H04N 21/252 725/9 |
| 2013/0227648 A1 | 8/2013 | Ricci |
| 2014/0160941 A1 | 6/2014 | Hui |
| 2014/0337871 A1 | 11/2014 | Garcia De Blas |
| 2014/0351840 A1 | 11/2014 | Andrade |
| 2015/0195126 A1 | 7/2015 | Vasseur |
| 2016/0112894 A1 | 4/2016 | Lau |
| 2016/0156520 A1 | 6/2016 | Scully |
| 2016/0164761 A1 | 6/2016 | Sathyanarayana |
| 2016/0232538 A1* | 8/2016 | Papakostas ........ G06Q 30/0201 |
| 2016/0241927 A1* | 8/2016 | Kilar ...................... G06Q 30/02 |
| 2017/0126476 A1 | 5/2017 | Curtin |
| 2017/0171252 A1* | 6/2017 | Xue .................... H04L 65/1069 |
| 2017/0188094 A1 | 6/2017 | Ionescu |
| 2017/0223036 A1 | 8/2017 | Muddu |
| 2017/0244777 A1 | 8/2017 | Ouyang |
| 2017/0250882 A1* | 8/2017 | Kellicker ................ H04L 43/08 |
| 2018/0278487 A1 | 9/2018 | Mermoud et al. |
| 2018/0288461 A1* | 10/2018 | Funk ..................... H04N 21/24 |
| 2019/0045235 A1* | 2/2019 | Giladi .................. H04N 9/8205 |

OTHER PUBLICATIONS

Manferdini et al., Cross-Check of Analysis Modules and Reasoner Interactions, Oct. 30, 2014, pp. 1-75.
Manferdini et al., Cross-Check of Analysis Modules and Reasoner Interactions, Oct. 30, 2014, pp. 76-150.

* cited by examiner

Alerts

Ads | Pods

Total Alerts: 9 | Enabled Alerts: 9 | Disabled Alerts: 0

[Add Alert]

| Alert Name | Filter | Condition | Sample | ▼ Last Event Time | Action |
|---|---|---|---|---|---|
| ▶ US Desktop | Device Type = US Desktop | Ads Failed > 10% | > 14% | Jan 19 2016 23:55 | ✻ |
| ▶ High VST | Ad Video Start Time > 3s | Ad Video Start Time > 3s | > 10 seconds | Jan 19 2016 23:45 | ✻ |
| ▶ The Martian | Content Type = "The Martian" | Ads Failed > 3% | 10 minutes | Jan 19 2016 20:18 | ✻ |
| ▶ iOS | Device Type = iOS | Ads Abandoned > 15% | >20% | Jan 19 2016 20:18 | ✻ |
| ▶ New York | Geo = New York | Ads Failed > 3% | 5 Minutes | Jan 19 2016 20:18 | ✻ |
| ▶ West Coast | Geo = West Coast | Ads Started > 3% | >20% | Jan 19 2016 19:20 | ✻ |
| ▶ The Martian | All Traffic | Ads Completed > 3% | 10 Minutes | Jan 19 2016 13:28 | ✻ |
| ▶ Live Sports | Content Type = Live Sports | Ads Abandoned > 15% | >20% | Jan 17 2016 21:22 | ✻ |
| ▶ The Martian | Content Type = "The Martian" | Ads Started > 3% | >20% | Jan 17 2016 21:22 | ✻ |

FIG. 5E

CORRELATING PLAYBACK INFORMATION OF VIDEO SEGMENTS

CROSS REFERENCE TO OTHER APPLICATIONS

This application claims priority to U.S. Provisional Patent Application No. 62/479,934 entitled CORRELATING PLAYBACK QUALITY OF CONTENT AND ADS filed Mar. 31, 2017 which is incorporated herein by reference for all purposes.

BACKGROUND OF THE INVENTION

Users are increasingly using networks such as the Internet to access content, such as video files and live streaming/video on demand content, via client machines. Such content is often large, time sensitive, or both. As demand for such content increases, there are challenges in distributing that content efficiently and with high quality. As one example, it can be difficult to determine the impact that various factors associated with content playback may have on user experience.

BRIEF DESCRIPTION OF THE DRAWINGS

Various embodiments of the invention are disclosed in the following detailed description and the accompanying drawings.

FIG. 5E illustrates an example embodiment of an alerts report.

DETAILED DESCRIPTION

Figure 1A:
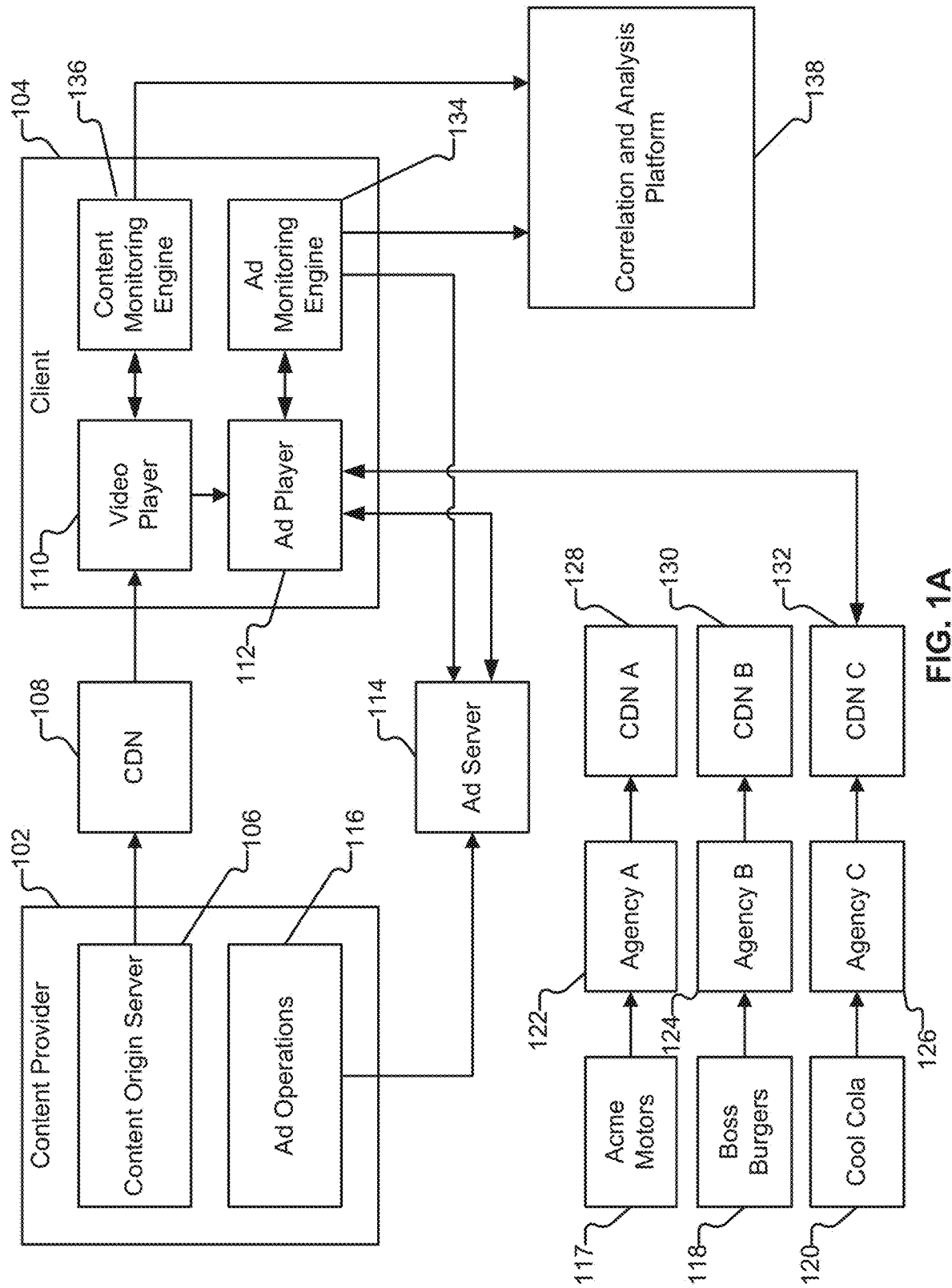
FIG. 1A illustrates an example embodiment of an environment in which content is distributed and ad information is collected and analyzed in a client side ad insertion scenario.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

When viewing streaming content (e.g., live and/or on-demand video (VOD) content), the quality of a user's streaming experience may be determined, for example, by measuring QoE (quality of experience) metrics for interruptions, resolution, fidelity, wait times, or any other metrics related to the playback of the streaming content. Such measurements may then be used, for example, to determine insights into how streaming performance drives user engagement, and how the experience for users may be improved.

Users' experiences when streaming video may also be impacted by the ads that are played along with content. Content that is streamed via video sites may include pre-roll ads (e.g., ads that are played just prior to the start of content), after which the content starts. After the content plays for a time, mid-roll ads may be played. Thus, when watching content, users may be presented with a series of ads at the beginning and the middle of the content being viewed during a streaming session.

Ultimately, from an end user/viewer experience, the quality of experience of their streaming session may depend on the combined experience of both the ad and the content being played. For example, the end user's experience may depend not only on the experience with respect to the content (e.g., whether the user liked the content, the experience of the content playback itself, the number of interrupts, etc.), but also on the experience with respect to the ad or ads that were played (e.g., were there too many ads, were the ads inappropriate or unrelated to the interests of the user, were there issues with playback of the ads, etc.). For example, if an ad that is configured to play at the start of content is meant to be 30 seconds, but does not start for 10 seconds, users may become frustrated and quit the entire video session.

Thus, the ads that are played may have an impact on an end user's overall experience with streaming a content item requested by the user. Described herein are techniques for determining insights into the relationship between the playing of content and the ads that are played with the content, which may include correlating content playback quality, ad playback quality, and ad metadata information.

One example of an ad impacting the quality of end user experience for a streaming session is as follows. Suppose that a show (e.g., content requested by a user) that the user has been watching has been performing well (e.g., with no buffering, at a high bitrate). An ad begins to play. However, the ad begins buffering. Due to the buffering of the ad the user is forced to wait before the playback of the content they requested can continue, which may negatively impact the user's overall streaming experience. Because of the ad, the user may then close the video session due to the poor performance of the ad. Thus, the experience of the ad may have a large impact on the end user's engagement and their satisfaction.

In existing ad monitoring techniques, only counts of ads are typically measured, which may be used to determine how content publishers are paid for the ad. For example, a broadcast network may generate revenue by counting the number of ads that were placed.

As will be described in further detail below, using the techniques described herein, in addition to measuring the quality of the playback experience of content, ad playback quality and experience may also be measured. For example, the same type of QoE and performance metrics used in measuring content can be measured for ads as well. In some embodiments, the experience of the ad is then correlated or otherwise connected or matched with the experience of the content to determine a unified experience of a session.

In some embodiments, the techniques for determining ad experience may be adapted to accommodate the various manners in which ads are delivered. For example, ads may be delivered by a third party different from a content provider (e.g., publisher of content). While a content provider may be able to control the experience of the content they provide, the content provider may not be able to control the experience for ads. For example, while the content provider may provide a slot (or slots) in their content for ads, other entities, such as agencies representing brands, may be serving the ads that are placed in those slots. Thus, there may exist a level of indirection and complexity in determining ad experience, where content providers may not have as much control with respect to delivery of ads and the ad experience.

As will be described in further detail below, by using the techniques described herein to measure ad playback quality and correlate the measured ad playback quality with content playback quality, further optimizations with respect to ad placement and delivery to improve experience can be performed. For example, a determination of a number of ads (e.g., three ads versus two ads) that should be placed for different types of content on different types of devices that would result in an improved end user experience may be performed.

For example, for sports content versus movie content, a difference in user engagement between playing three ads and two ads may be determined. While on a per session basis, playing two ads versus three ads results in fewer ads being shown to an end viewer, showing only two ads may result in larger numbers of people watching content including the ads, resulting in an overall increase in user engagement and ad visibility. Thus, using the techniques described herein, by correlating ad information (e.g., playback quality information and metadata about the ad, such as its name, what server it was served from, etc.) with content playback information, further insights, such as an optimal or appropriate ad load, may be determined.

This is in contrast to other forms of media, such as traditional television, in which the number of ads that are played is fixed. For example, television is typically schedule based, with shows being required to fit within a certain time period, and with a certain amount of time allotted for the playing of ads.

In comparison to traditional television, where the predominant experience is users sitting in front of their television to watch content, when streaming audiovisual content online, end viewers may watch content in a variety of contexts, such as at home on their television, on a desktop computer, on their mobile phone or tablet while traveling, etc., resulting in different end user experiences. Using the techniques described herein, control of ads may be facilitated to optimize the experience for these various contexts. For example, a different amount of ads may be displayed to a user on a mobile device (e.g., where the user may be watching a short, fifteen minute length content) versus when the user is streaming content at home on a large display (e.g., where the user may be watching a two hour movie).

Using the techniques described herein, a data driven process may be used to allow content providers to understand the impact of ads on end user experience as well as the relationship between ads and the content with which they are associated (e.g., the content before and/or during which the ad is played). A data driven approach to learning based on various attributes, such as content type, content genre, device type, screen size, etc., may then be used to tailor the ad experience for different contexts (e.g., different viewers or streaming sessions with different attributes).

As will be described in further detail below, in some embodiments, the data driven approach to determining ad insights is based on the collection of ad information, such as ad playback performance or quality of experience information (e.g., resolution, buffering, start time, etc.), ad metadata (e.g., the exact ad that was played, the source of the ad, etc.), etc. In some cases, there may be technical challenges in obtaining such ad information, as ads may be delivered in different ways, where even content providers may not be aware of the source of an ad or from where the ad is being served, or what ad is being served. Further described herein are techniques, protocols, and mechanisms for obtaining ad information in different ad delivery contexts, such as client side ad insertion and server side ad insertion scenarios, examples of which will be described in conjunction with the environments of FIGS. 1A and 1B.

By obtaining ad playback experience and metadata information about the ads, and correlating/connecting such information with content playback experience/quality information of content associated with the ad (e.g., the content before and/or during which an ad was played), insights into advertisements can be determined, as well as strategies for how ads should be utilized. For example, by correlating ad and content information, various determinations may be made, such as an optimal strategy with respect to ad load (e.g., number of ads to be played), the frequency of ad breaks, the length of each ad break, the placement of ad breaks (e.g., pre-roll before the content starts, mid-roll during the content (of which there may be multiple mid-roll ad breaks), etc.), the number of ads to place in each ad break, etc., to improve ad and content experience.

As another example, based on the correlation of ad information and content information described herein, a determination of what ads were played for what piece of content can be made, allowing for direct comparisons and insights into ads and content to be made or inferred between the ads and corresponding content. One example of such a comparison includes determining the difference in bitrate of an ad and content. For example, if a user is watching movie content at 5 Mbps, in high definition, but the ad that is played during the content is at a low bitrate and pixelated, this abrupt difference or switch in quality may be jarring to the viewer, and lead to a poor quality session experience. This is different from traditional television contexts, in which image quality is consistent between content and ads. In the case of online streaming, because ads are dynamically inserted into content, and potentially served from different locations, such consistency may not be available, potentially leading to poor experiences. Thus, by correlating ads and content, analytics may be used to determine the difference in quality or experience when switching between playing content to playing an ad. Differences between ads and content for various other quality metrics (e.g., buffering, join time, start failures, etc.) may also be determined. The drop off in audience numbers (e.g., based on a determination of aborted sessions) may also be measured to determine the impact that poor ad experience has on user engagement with a video session.

Thus, using the techniques described herein, by correlating ad playback, ad metadata, and content playback, insights into ads and their impact on the experience of viewing content during a streaming session may be determined. Further, the insights gained may be used to determine how ads should be utilized to improve the quality and end user experience of online video streaming and provide an optimal viewer experience. Various techniques (e.g., using session identifiers) for performing correlation will be described in further detail below.

While example embodiments in a video streaming (e.g., live and on-demand streaming) ecosystem are described below, the techniques described herein can variously be adapted to accommodate any type of multimedia/audiovisual content distribution, as applicable.

The examples throughout the specification will make various references to advertisements and content that is requested by users. As used herein, "content" refers to content items that an end user or viewer has requested to watch. As used herein, "ads" are the advertisements (e.g., video ads) that are played while the user is watching the requested content, such as at the beginning of the content (e.g., pre-roll ad) or during the content (e.g., mid-roll ad). Advertisements and the content requested by users are but two examples of video segments that may be correlated using the techniques described herein.

The examples throughout the specification will also make various references to correlation of playback quality information of video segments, as well the correlation of playback quality information and metadata information of a video segment. Playback quality information is but one example of information that may be correlated using the techniques described herein. For example, correlation of engagement information of video segments and correlation of engagement information and metadata information of a video segment may also be performed.

Collecting Ad Playback Quality Measurements and Metadata Information

Ads may be inserted into content in various ways. Two example modes of ad insertion include client side ad insertion and server side ad insertion, which will be described in further detail below. Based on which mode of ad insertion is used, different protocols and techniques may be used for obtaining or collecting ad information (e.g., ad playback quality information and ad metadata information).

Client Side Ad Insertion

FIG. 1A illustrates an example embodiment of an environment in which content is distributed and ad information is collected and analyzed in a client side ad insertion scenario. In client side ad insertion, ads are delivered to a client video content player, which is configured to insert the ads (e.g., obtained from an entity external to the content player) into a video session that is used to stream content.

In the example shown, client 104 is used to access content, such as audiovisual content (e.g., movies, songs, television shows, sporting events, games, images, etc.) that is owned by content owners. The content is stored (or captured) at origin servers such as origin server 106, then distributed via other servers, caches, content distribution networks (CDNs), proxies, etc. (collectively, "content sources"). Content sources employ a variety of technologies and include HTTP, Adobe Flash Media, and Microsoft Internet Information Service servers.

Examples of clients include personal computers, laptops, cellular phones/personal digital assistants, and other types of information appliances such as set-top boxes, game consoles, broadband routers, file servers, video servers, and digital video recorders, as applicable.

In the example shown, a television network ("XYZ") (content provider 102) has contracted with content distributor 108 to provide viewers with access to live streams of its broadcasts as well as streams of television show episodes and sporting events. In some cases, the content distributor is owned/operated by the content owner.

Content may be delivered/provided to clients based on various protocols. As one example, online video is delivered to clients via chunk-based protocols, in which a video player on a client fetches a manifest file (e.g., metadata configuration file) that lists a sequence of location information (e.g., HTTP URLs) that points to chunks/segments of video content (e.g., 2-10 second ".ts" transport segment chunks stored on the CDNs) that together constitute a full video. The video player may then fetch the chunks/segments/components one by one according to the manifest file, which indicates how the chunks may be retrieved from the CDNs so that they can be stitched together by the client media player to render a video asset as a smooth stream.

In this example, suppose that a user of client 104 would like to watch, using a player application, a television (TV) show owned by content provider 102. For example, the user begins a video streaming session (e.g., by hitting "play" on a selected video). As used herein, a session refers to an entity representing an instance of a user's playback interactions with the requested content asset. The session may begin with a user's request for a particular content, and end when the user ceases playing the content (e.g., the user stops watching a requested video).

In the example shown, when the user hits play and starts the session, the client is directed to a portal owned by the content provider (e.g., by using a web browser application, mobile app, etc.), causing client 104 to connect to a content management system (CMS), which may be operated by the content provider and used by the content provider to manage its media assets.

Continuing with the example of a chunk-based protocol, the requested TV show may be stored as a set of video chunks/segments that together constitute the full video asset. The generated chunks may be published to various CDNs such as CDN 108, with corresponding manifest files generated that indicate the location (e.g., URLs) of the chunks for a content item.

In this example, client 104 is directed by the CMS to CDN 108 to obtain a manifest file (e.g., HLS manifest file) for the requested TV show. The content player 110 on client 104 then uses the obtained manifest file to begin streaming content from CDN 108 (e.g., requesting, fetching, and playing chunks of the TV show that was requested).

In the example environment of FIG. 1A, in which client side ad insertion is performed, advertisements are served and played as follows. In this example, client 104 includes ad player 112. In some embodiments, ad player 112 and video player 110 are components or modules of the same player application (but may be parts of separate applications in other embodiments). The player application may be a dedicated application or an application provided by a web browser application. In this example, video player 110 and ad player 112 are two different players, where the players are switched between depending on whether content is to be shown, or an ad is to be displayed.

In this example, ad player 112 communicates with ad server 114. Ad server 114 is configured to serve ads. In some embodiments, the ad server is associated with its own CDN to deliver ads. The ad server has stored ad content. In some embodiments, ad player 112 is implemented as a player side plugin. Ad player 112 is configured to communicate with ad server 114 and request an ad to play. In some embodiments, the ad server and the ad player are provided or supplied by a same vendor (e.g., FreeWheel), where the vendor may work with content provider 102, with the ad server operating on behalf of the content provider to manage campaigns and rules for placing ads in the vendor's ad players.

In this example, video player 110 is playing the requested TV show. Ad(s) are to be played at a particular point (or points) of the video. The video player communicates with the ad player, instructing the ad player to play an ad when the video reaches the particular point in the video. The ad player then communicates with the ad server, requesting that the ad server provide the ad player with an ad to play. In some embodiments, additional information such as ad playing criteria are provided by the ad player to the ad server, such as an amount of time to be filled with ads (e.g., length of an ad break).

Ad server 114 receives the request for an ad (and any other criteria or parameters, as appropriate) from ad player 112. In the example shown, the ad server is programmed or configured with a set of campaigns, policies, and/or rules for ad insertion. The campaigns, policies, and/or rules may be configured, for example, by an ad operations team (116) associated with the content provider (e.g., using tools to set up and campaigns and rules for ad insertion with the ad server). Based on the campaigns, policies, and rules, the ad server is configured to determine and provide a location (e.g., a reference to a uniform resource locator (URL)) of an ad (or ads) in response to the request for the ad.

Suppose, in this example, that television network XYZ has made direct sales (e.g., sold portions of its ad inventory or ad slots) to a number of advertisers/brands, such as Acme Motors (117), Boss Burgers (118), and Cool Cola (120). Viewers of content provided by network XYZ will receive ads from either Acme Motors, Boss Burgers, or Cool Cola. In this example, the advertisers are represented by respective ad agencies 122, 124, and 126. As shown in this example, each ad agency is associated with a CDN (respective CDNs 128, 130, and 132) with which they serve the ads for the respective represented brands.

One example of a campaign is a contract between the content provider and Cool Cola to play one million Cool Cola ads on XYZ's web site over the next month. In some embodiments, the campaigns are based on business agreements with the advertisers and ad agencies. In this example, the campaign is a business agreement with a quota or number of ads to play within a period of time. In some embodiments, the timeline and quota are programmed into the ad server.

Rules may be used to manage the placement of ads based on various criteria. One example of an associated rule is a rule regarding content with which an ad for Cool Cola may be played. For example, suppose that XYZ has ten different genres of content. A rule may be specified indicating that Cool Cola ads should only be played for comedy and action genre content, or that ads should not be played for certain genres of content, such as soap operas. Another example of a rule is one that specifies the insertion of ads based on device type. For example, a rule may be specified indicating that Cool Cola ads are only to be played on one type of device, and not on another type of device. As another example, rules may be specified that define what ads may be played based on viewer information, such as user attributes (e.g., demographic information). Thus, the rules may be used to determine, on a per-viewer basis, the conditions under which ads are delivered/placed (e.g., based on type of device, content, characteristics of the user, etc.). In some embodiments, the rules are programmed in the ad server.

In some embodiments, the campaigns and rules are manually programmed into the ad server (e.g., by an ad operations team). For example, an administrator user with access to the ad server may manually enter new campaigns, track those campaigns, update the campaigns and rules, prioritize one campaign over another, etc.

In some embodiments, other ad delivery criteria are also configured at the ad server, such as ad load (e.g., number of ads to play in an ad break slot). As will be described in further detail below, using the techniques described herein, an optimal ad load may be determined based on collected and analyzed ad and content experience/quality data. In some embodiments, the ad load and decision of what ads to be played may be made on a per viewer request (in contrast, for example, to traditional television, where the decision of what ad to play is controlled in bulk for an entire audience, and not on a per-viewer basis)

In this example, the ad server is configured to use the programmed campaign criteria, rules, and policies when processing requests for ads from client 104. For example, when ad player 112 requests an ad to play from ad server 114, ad server 114 is configured to use the campaign and rules with which it was programmed to determine or select an ad (or ads) for the ad player to play. In the example shown, the ad server responds to the ad player's ad request with a URL (or URLs) to the ads the ad server has selected based on the campaign and rules.

For example, suppose that in response to ad player 112's request for an ad, ad server 114 selects a set of Cool Cola ads for the ad player to play. Ad server 114 returns to the ad player a set of URLs corresponding to the selected ads. These URLs point to CDN C (132) which holds the actual ads to be played (i.e., the URLs point to the location of the actual ads). The ad player, using the set of URLs, is redirected to CDN C, which delivers the corresponding selected ads to the ad player. While a single redirect of the ad player is shown (e.g., redirection from ad server to CDN C), multiple levels of redirection may occur.

In the example shown, client 104 includes ad monitoring engine 134 and content monitoring engine 136. Content monitoring engine 136 is configured to measure performance and quality of experience of content playback using video player 110. In some embodiments, the content monitoring engine is integrated with the video player. Various examples of quality of experience measurements include measures/metrics associated with bitrate, average bitrate (e.g., average bitrate sustained over the lifetime of a session during which the video is played), buffering, failures, startup time (measures of how long the content took to start playing), failure events (e.g., failure to start), buffering ratio (which indicates, for example, a percentage of time or how often a stream is being buffered or interrupted), the number of buffering events (if any), the length of a buffering event, the number of frames per second rendered by a video/ad player, failed connection attempts, premature connection terminations, etc. In some embodiments, information pertaining to user behavior/engagement is obtained for ads and/or content. Examples of user behavior/events include: starting and stopping playing a video or audio stream, seeking within the stream, skipping through the stream, abandoning the streaming session (e.g., by closing the player application), switching the player to full screen mode, minimizing/restoring the player, a change in the volume level of the player, and clicking on an advertisement. Other examples of information about the content playback include engagement metrics as well as local state information. Examples of local state information include current measurements of the client, such as a content player's current bitrate, current CDN, current player state (e.g., playing, buffering, paused, stopped), current player buffer length, current play head time/position, current bandwidth measurement estimations, current frame rate, etc. Other state information may include events such as error events. Examples of engagement information or measures include a length of time that the video segment has been playing, a length of time that the client has been connected to a content distribution network, an amount of data associated with a download of the video segment, a display mode of a video screen, a viewer interaction with at least one player control, and a viewer interaction with the video segment. In some embodiments, the measurements performed by content monitoring engine 136 are collected on a per-session basis.

In this example, the content monitoring engine is configured to provide the measurements to correlation and analysis platform 138, which will be described in further detail below. In some embodiments, the measurements made by the content monitoring engine are associated with metadata about the content (e.g., name of the content, genre, etc.). The content information may also be associated with an identifier of the session in which the content was played.

Ad monitoring engine 134 is configured to measure quality of experience of ad playback using ad player 112. In some embodiments, the ad monitoring engine is integrated with the ad player. In some embodiments, the same experience measurements and metrics made for content played using the video player (e.g., performance metrics, engagement metrics, local state information), as described above, are also made for the ads that are played with the content. For example, ad quality playback information such as buffering events, bitrates, start times, join times, etc. with respect to the playing of an ad may be measured. Summary/aggregate information based on the ad quality playback measurements may also be computed, such as rebuffering ratios, average bitrates, etc. In some embodiments, other event information, such as ad requests, ad failures, ad abandonments (e.g., a user closed the player application during the ad), ad skips, ad blocks, ad completes, etc. are also detected and recorded or otherwise obtained. In this example, the ad monitoring engine is configured to provide the experience measurements made with respect to ads played by the ad player to platform 138.

In addition to measuring the playback experience and engagement for the ad, the ad monitoring engine may also obtain other measurements about the ads that were played, such as ad load information, including the length of an ad break, the position of the ad break (e.g., pre-roll or mid-roll), etc. Measurements associated with pods (which may include multiple ads) may also be determined, such as pod duration, the position of the pod relative to content (e.g., pre-roll or mid-roll), etc. Such additional measurement information may be used to perform further analytics, as will be described in further detail below.

In some embodiments, client attributes/parameters are also obtained, such as device type (e.g., desktop, mobile device, etc.), operating system (e.g., iOS, Android, Windows, etc.), user agent, Internet Protocol (IP) address, geolocation, etc. Such client attribute information may be associated with the ad/content measurement information (e.g., added to the information or otherwise linked to it, for example, via a client application identifier, session identifier, and/or ad identifier). Such client attribute information may be used to further segment measurement data and computed metrics (e.g., breaking out ad failures by the attribute of device type), as will be described in further detail below.

In this example, the ad player has knowledge of the ad that was played by the ad player (e.g., has access to information identifying the ad that was played) for the requested content. In some embodiments, the ad player is also configured to obtain metadata associated with the ad that it is playing. For example, when the ad player communicates with ad server 114 to obtain the URLs for a set of ads to be played, the ad player also obtains, from the ad server, metadata about the ads, such as an identifier of an ad (e.g., unique identifier), the creative name of the ad, the agency that served the ad, the campaign that the ad was a part of, rules associated with the ad, etc. Such information associated with an ad is referred to herein as "ad metadata." Metadata information about the ad may also be derived. For example, in client side ad insertion, the client is configured to insert ads into the video stream. The ad player may derive or extract the identifier of the ad from the URL for the ad (e.g., the URL string may include the identifier for the ad, and the ad player is configured to extract the identifier from the URL string). In some embodiments, the extracted identifier is then used to query the ad server, which returns additional corresponding metadata information about the identified ad.

In some embodiments, the playback experience measurements for an ad are associated with the additional metadata information about the ad collected from the ad server. The combined information is then sent to platform 138.

In some embodiments, the ad information is associated with an identifier of the session in which the ad was played. Other information, such as timestamp information about when ads were played and when content was played, is also provided to backend 138.

For example, in some embodiments, the information collected by the content monitoring engine and the ad monitoring engine are tagged with unique identifiers. For example, every content playback session and ad playback session may be associated with a unique identifier.

As one example, each client player application may be associated with a client application identifier (CID). With each client application, each content or video playback session may further be associated with an identifier (session identifier, or SID). One example of a session identifier is a random number. The content or video playback session may then be uniquely identified by the combination of CID and SID.

Typically, when an ad is played, the content video session associated with the ad has already been created (because the ad is usually triggered by a viewer that wishes to watch a particular video), and thus, when an ad is played, information about the corresponding video session is already available (e.g., SID and CID of the content playback session during which an ad is played). In some embodiments, the information collected by the ad monitoring engine with respect to the playback of an ad is tagged or otherwise associated with the uniquely identifiable combination of <CID,SID> of the corresponding content playback session. For example, for every event and measurement associated with the ad, the unique combination of <CID, SID> is added to the attributes of the event/measurement. Further, in some embodiments, for every ad playback session, the combination of <CID, SID> for the content being played is added to the video attributes of the ad playback session. Thus, information associated with an ad, such as ad playback quality information and event information, is associated with the unique identifier of the corresponding content playback session, and thus, in some embodiments, based on the tagging, the ad related information is correlated with the content video session for which the ad was played.

In some embodiments, the ad metadata information obtained by the ad player is also tagged with the unique identifier combination of <CID, SID>.

As will be described in further detail below, ad playback quality, ad metadata information, and content playback quality may be correlated through the use of such identifiers.

In some embodiments, the collected information relating to ad and content played on the client is associated with timestamps indicating when the information (e.g., ad events, ad video session, content video session related information) was collected. As will be described in further detail below, in some embodiments, such timestamp information may be used as a heuristic to infer correlation between ad related information and information related to a particular content playback session.

Platform 138 is configured to ingest the collected information to provide analytics to determine insights into the ads that were playing. As will be described in further detail below, platform 138 is configured to correlate the different sets of content playback quality information, ad playback quality information, and ad metadata. Various types of processing may then be performed on the correlated data. For example, platform 138 is configured to determine metrics such as difference metrics (for determining the difference in quality between ads and correlated content), ad funnel metrics, and ad fatigue metrics. The information may also be used to measure and diagnose ad playback experience. Further details regarding platform 138 will be described in further detail below in conjunction with FIG. 2.

In some embodiments, the various example entities shown in the example environment of FIG. 1A, such as content provider 102, CDN 108, ad server 114, CDNs 128-132, client 104, and correlation and analysis platform 138 communicate with each other over a network such as the Internet.

Server Side Ad Insertion

Figure 1B:
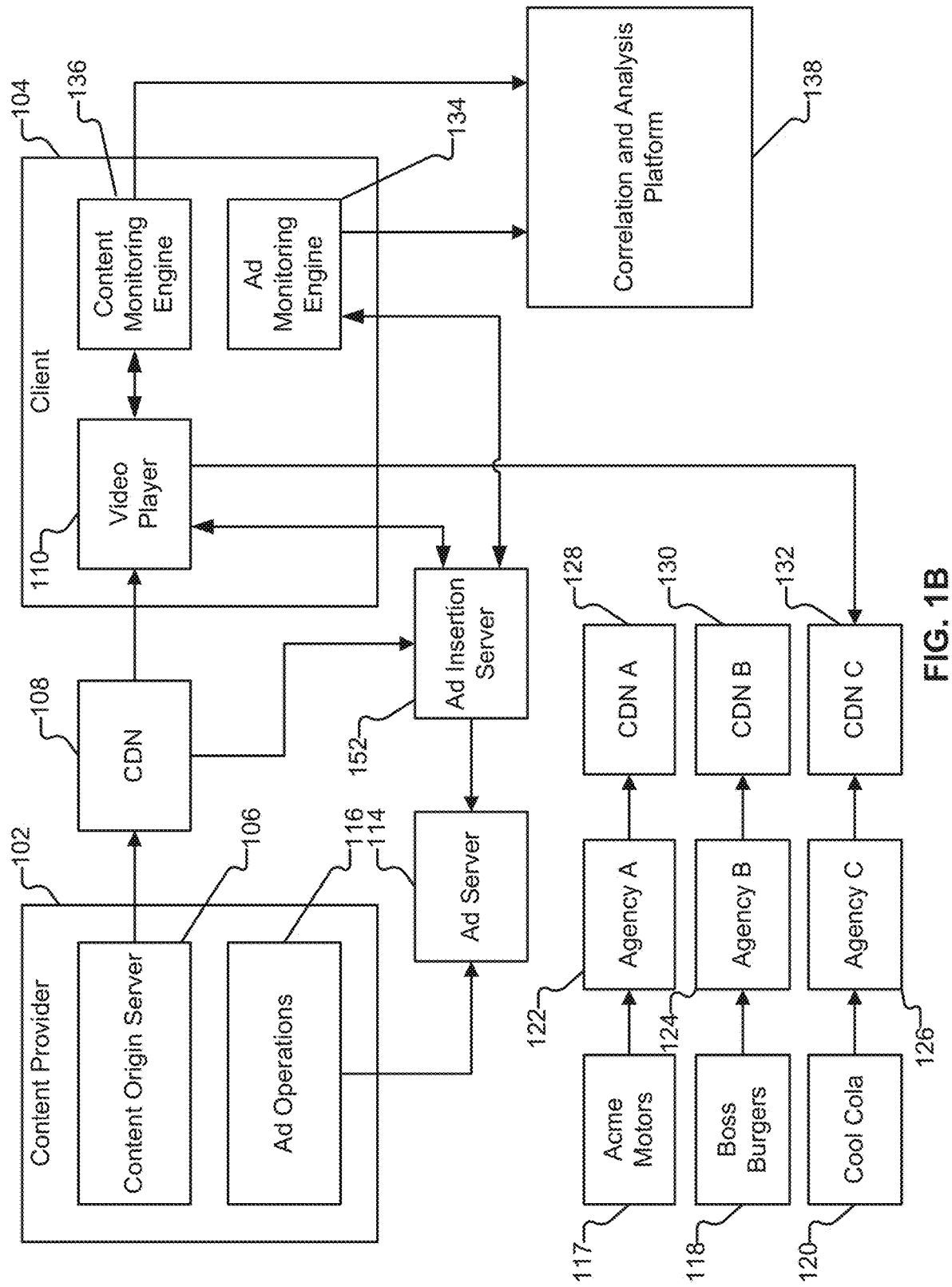
FIG. 1B illustrates an example embodiment of an environment in which ad information is collected and analyzed in a server side ad insertion scenario.

FIG. 1B illustrates an example embodiment of an environment in which ad information is collected and analyzed in a server side ad insertion scenario. In server side ad insertion, in contrast to the client side ad insertion scenario described above in conjunction with FIG. 1A, ads are pre-inserted into the content by an entity external to the client content player.

In the example of FIG. 1A, the client includes an ad player configured to manage requesting and playing of ads. One example challenge of having ad players installed on clients is that it may be difficult to maintain those client players, such as fixing bugs, improving the ad players, etc., which is compounded by the disparate type of client devices that may be in use.

In the example server side ad insertion as shown in FIG. 1B, the functionality provided by the ad player of client 104 is moved out of the client and instead included in a new component, ad insertion server 152. In some embodiments, the ad insertion server is configured to communicate with ad server 114 and the video player 110 at client 104.

In this example, when the video player of client 104 requests a manifest file to play a requested video (e.g., an HLS manifest file), instead of the video player being directed (e.g., by a CMS) to CDN 108 to obtain the video manifest file, the video player is instead directed to server side ad insertion server 152.

The ad insertion server is configured to obtain the appropriate manifest file (i.e., the manifest file for the requested content) from CDN 108. As described above, a manifest file includes a list that is a series of URLs to chunks to be played (e.g., where the chunks, when played sequentially, form the entire content). The ad server is configured to determine where an ad should be played, and then dynamically modify/rewrite the original manifest file by replacing or inserting URLs to the ads among the content chunk URLs at appropriate locations among the content chunks (e.g., at the time locations where ads are to be played such as at the beginning or during the content). The original content chunks (the URLs to the content chunks) are not modified.

Ad insertion server 152 then provides the video player the modified manifest file, which includes the locations (e.g., URLs) of the video chunks that together constitute the requested content.

The revised manifest file, with ad chunks dynamically included/inserted among the original content chunks, is then provided to the video player. The video player is then configured to obtain the chunks using their corresponding URLs listed in the manifest file, and sequentially play the chunks. In this example, from the video player's perspective, it is playing a series of video chunks, irrespective of whether the chunk being played is for an ad or for the content requested by the user of the client. This is in contrast to the example of FIG. 1A, where an ad player is configured to play chunks belonging to ads, and the video player is configured to play chunks belonging to content (because the ad playing is separated from the content playing). In the example of FIG. 1B, the video player plays both ad and content, without switching to a different player to play ads, as in the example of FIG. 1A.

In some embodiments, the video player is configured to identify when an ad is played. For example, an identifier or tag indicating that an ad chunk is being played may be used to allow the video player to determine that an ad is being played. As one example, a marker in an HLS manifest file called a "discontinuity tag" indicates to the player when the next chunk will be from a different video, such as an ad. Based on the indication of an ad being played, the video player may prevent a viewer from skipping the ad (e.g., by disabling the ability to perform skipping when playing an ad chunk).

In some embodiments, the ad monitoring engine is configured to collect quality and event information associated with playback of an ad as described above. For example, the video player may determine when an ad is playing, and the ad monitoring engine is configured to measure ad quality of experience metrics (e.g., when ad started or ended, buffering, startup time, pod metrics, etc.).

While the client may know that an ad is being played and be able to measure quality/performance information for what the client knows to be an ad, in this example, additional metadata information about the ad (e.g., ad creative name, campaign, rules/policies associated with campaign, upstream CDN, agency CDN, etc.) may not be available to the video player. It would be beneficial to associate measured ad playback quality with additional metadata about the ad, in order, for example, to further analyze and understand the quality of ads with various attributes. Further details regarding obtaining such ad metadata, which may reside on a data store separate from the client, and correlating such ad metadata with quality measurement information taken on a client will be described in further detail below.

In some embodiments, unique content/session identifiers (e.g., where the client/application session identifier may be embedded in the manifest file and/or obtained from the client player application) and unique ad identifiers (e.g., where the ad identifier may be extracted from a URL to an ad chunk in the obtained manifest file) can be used to obtain ad metadata information. As one example communication protocol, from the client, an identifier of an ad may be included in a cue point. In some embodiments, a cue point is a metadata element that contains a timestamp at which the switching between two video chunks should occur. The ad identifier may then be sent to platform 138. The backend platform may then perform a look up (e.g., by performing a query using the ad identifier), of the ad server 114 and/or ad insertion server 152, and retrieve the relevant metadata associated with the queried-for ad identifier. In other embodiments, the ad monitoring engine is configured to communicate with and query one or both of ad server 114 and ad insertion server 152 to obtain the additional ad metadata information. As another example, the unique content/session identifier embedded in the manifest file may also be used to query the ad insertion server to determine what ads were inserted by the ad insertion server for the video playback session. The ad metadata, identified by a corresponding ad identifier, may then be correlated, mapped, or otherwise associated with the content (which is identified by a corresponding unique identifier).

In some cases in the server-side ad insertion scenario, the content player on the client may not have knowledge of what ads were played during the session (e.g., the client may not have access to the ad identifiers of the ads that were played). However, such knowledge may be available to the ad insertion server, which knows what ad segments it inserted into the content video stream for a playback session. In some embodiments, in order to determine what ads were played for a session, the session identifier is obtained. The ad insertion server is queried using the session identifier. Based on the query, the ad insertion server returns the ad identifiers of the ads that it inserted into the content for that session. Thus, the ads that were played for a session may be identified. In some embodiments, ad metadata associated with the ads is also returned by the ad insertion server. If ad metadata is not returned by the ad insertion server (but the ad identifiers are returned), the ad identifiers returned by the ad insertion server may be used to make additional network request/remote queries for ad metadata (e.g., by querying the ad server). These additional calls are used to obtain the ad metadata, which can then be correlated to ad playback quality.

In some embodiments, the ad metadata is tagged with the unique combination of client application identifier and video content session identifier, and thus the metadata for ads played during the content session may be mapped to ad playback information and the particular content session.

In some embodiments, as in the example of FIG. 1A, the information collected by the client related to content and ad playback sessions may be tagged with a unique identifier, such as a combination of client application identifier and video session identifier. Timestamp information may also be associated with the collected information. Such identifiers and timestamp information may be used to correlate ad related information (e.g., ad playback quality and ad metadata) with content related information (e.g., content playback quality), as will be described in further detail below.

Correlating Content Playback, Ad Playback, and Ad Metadata

Figure 2:
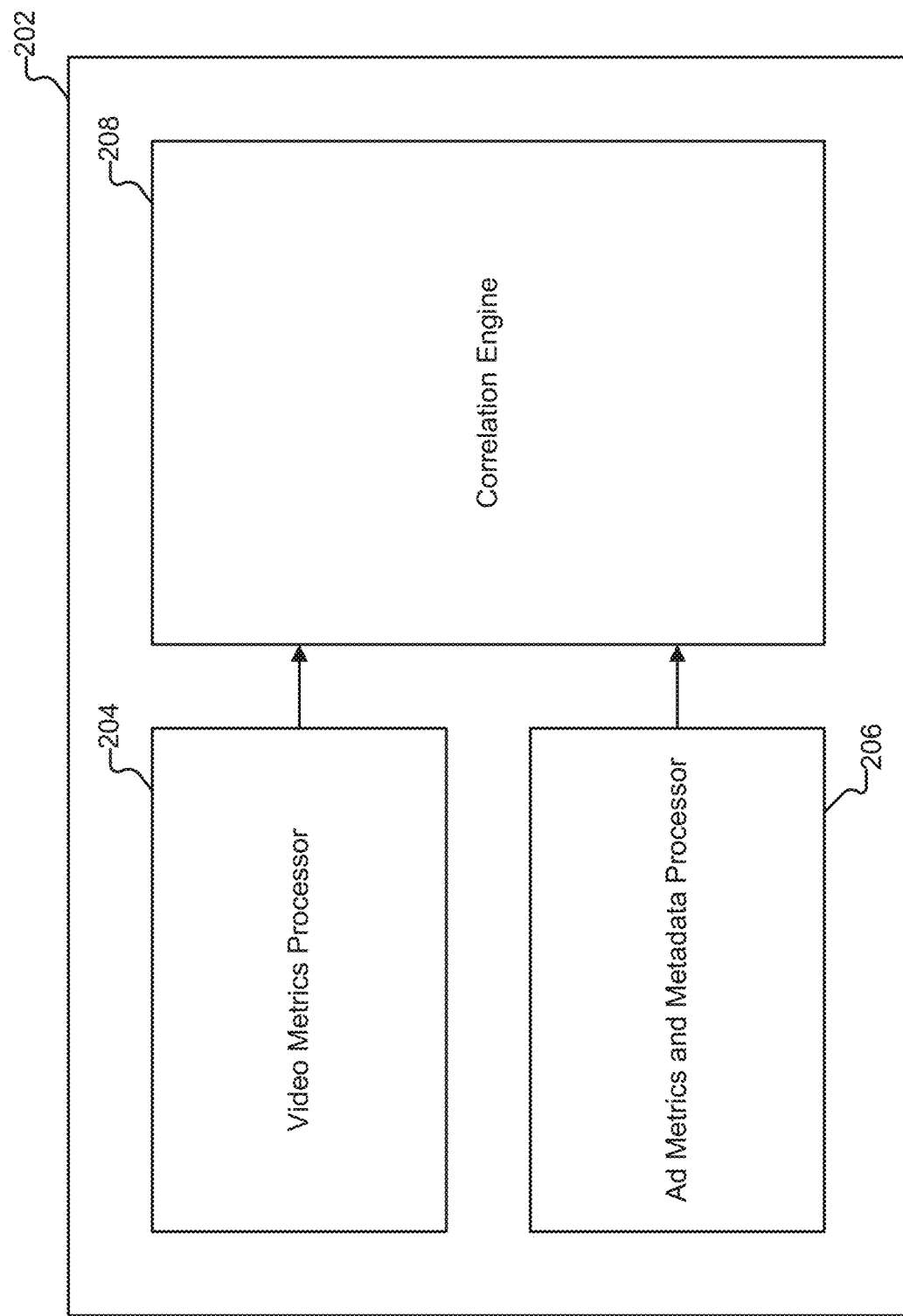
FIG. 2 illustrates an example embodiment of a system for correlating and analyzing ad and content information.

FIG. 2 illustrates an example embodiment of a system for correlating and analyzing ad and content information. In some embodiments, system 202 is an example embodiment of platform 138 of FIGS. 1A and 1B. In one example embodiment, platform 202 is implemented using Spark/Scala. In the example shown, system 202 includes video metrics processor 204, ad metrics and metadata processor 206, and correlation engine 208.

Video metrics processor 204 is configured to determine playback quality metrics for video sessions, including content playback sessions and ad playback sessions. In some embodiments, the determined metrics include quality metrics which are individually computed for ads and content. In some embodiments, the quality metrics for the ad and content playback sessions are computed using the raw content quality/experience measurement data collected by clients (e.g., by content monitoring engines and/or ad monitoring engines, as described above). In various embodiments, quality of experience metrics include buffering, bitrate, startup time, etc.

Ad metrics and metadata processor 206 is configured to determine metrics associated with ads, as well as collect ad metadata. In some embodiments, the metrics computed by the ad metrics processor are separate from those metrics determined by the video metrics processor that are related to the quality of the playback of an ad.

In some embodiments, the ad metrics include metrics associated with ads and ad pods, such as the duration of ads/ad pods, ad abandonment, ratio of ad pod actual duration to planned duration, number of ad pods per video session, etc. Another example of a metric computed by ad metrics processor 206 includes ad fatigue metrics, which will be described in further detail below.

In some embodiments, the ad metrics processor is configured to collect ad metadata information. As described above, the ad metadata information may be collected by platform 202 by querying data sources such as an ad server and/or ad insertion server. In other embodiments, the ad metadata information may be obtained from a client (e.g., ad monitoring module instantiated on the client) that has performed the queries to an ad server and/or ad insertion server.

Correlation engine 208 is configured to correlate ad and content related information. As described above, various types of data, such as ad playback quality information, content playback quality information, and ad metadata information, may be obtained or collected from various sources, such as ad players, content players, and ad servers. Correlation engine 208 is configured to correlate the different data sets, which may be obtained from the various disparate sources described above. In some embodiments, correlating the different sets of data includes determining what ad and content information are associated with each other (e.g., determining what ads were triggered by the playing of what requested content item). This may include determining what ad and content information are part of the same session on a client.

In some embodiments, correlation of the quality of ad and content playback on a client is performed. This may include correlating the quality metrics determined for a particular set of ads with quality metrics determined for a particular content item. The quality metrics may include those determined by video metrics processor 204 and/or quality measurements collected from a client such as client 104. For example, the quality measurements made for playback of content by a video player on a client and the quality measurements made for playback of an ad by an ad player on the client may be correlated with each other (playback quality for content and ads played by a same video player, as shown in the example environment of FIG. 1B, may also be correlated using the techniques described herein).

In some embodiments, correlation of the quality of ad playback on a client and ad metadata information is performed. In some embodiments, the ad and content playback quality information that is correlated includes the measurements collected from a player and/or the quality metrics computed for ads and content by video metrics processor 204. The ad metadata information may include information collected by ad metrics and metadata processor 206 from sources such as an ad server and/or ad insertion server. For example, an ad player may provide ad quality information, a URL for the ad, an ad identifier, etc. An ad server may provide ad metadata information including campaign, upstream ad servers, policies or rules that are associated with ads, etc. Correlation engine 208 is configured to correlate such data from the server and ad/video player, such that measurements from both ends of an active playback session (e.g., client application side and ad server side) may be performed, where the two different data sets from two different sources may be integrated by correlating them with each other.

As one example, ad metadata information obtained from an ad server, such as ad creative name, campaign name, etc. may be associated or correlated with quality information for a particular ad that was played on a client player application (i.e., integrating together data collected from the client with data collected from an ad server). The ad quality playback information and the ad metadata information may be correlated based on obtained ad identifiers. Various metrics may be computed based on the correlation of application side and ad server side data, such as failure rate by campaign, failure rate by ad server, etc.

In addition to correlating ad playback quality with content playback quality and correlating ad playback quality with ad metadata information, content playback quality may also be correlated with ad metadata information.

As described above, ad playback quality information, content playback quality information, and ad metadata information may be collected from various sources such as client applications and ad servers. Correlation engine 208 is configured to determine what data in the collected data is related to each other (e.g., associated with the same playback session).

The correlation of the data sets may be performed in a variety of ways, which will be described in further detail below.

Correlation Based on Identifiers

In one example, the correlation is based on session identifiers. For example, ads and content that have the same session identifier are associated or correlated with each other.

For example, as described above, in some embodiments, ad playback information, ad metadata information, and content playback information may be tagged with the same combination of client application identifier (CID) and video session identifier (SID), where a video session is uniquely identifiable by the combination of CID and SID. The ads that were played during the video session are assigned the same combination of CID/SID as the content that is played during the session. That data (e.g., ad playback quality, content playback quality, and ad metadata data sets) which shares the same combination of client and session identifier is correlated or otherwise associated with each other.

One example of a correlation algorithm that uses identifiers to correlate ads to video sessions associated with the ads is as follows. In this example, each video session is associated with a corresponding unique identifier. For example, each client application may be associated with a unique identifier (where the client application identifier is referred to as a "CID"). Within each client application, a random number is assigned for each video session (also referred to herein as a "session identifier" (SID)). A video session would then be uniquely identified by the combination of CID and SID. Typically, for every ad, a video session associated with the ad has already been created (typically, the ad is triggered by a viewer who wishes to watch a particular video, hence, the information regarding the video session should be available), and thus, the ad may be associated with the video session identifier.

For every event associated with the ad, the content video <CID, SID> is added to the event attributes. For every ad video session, the content video <CID, SID> is added to the video attributes of the ad video session. With these associations, ad related information (e.g., events, video session, etc.) may be correlated with a corresponding content video session (e.g., that triggered the request for ads).

In some embodiments, if a client application identifier is available or used, all content video sessions, ad video sessions, and ad events of the same client application would have the same CID, and in some embodiments, only these content video sessions, ad video sessions, and ad events are correlated within the same client application.

Correlation Based on Heuristics

In some cases, correlation based on identifiers may not be available. For example, when a pre-roll ad starts, the content video session that is triggering the ad may not yet have started or be known. In some embodiments, heuristics can be used to correlate ad events/ad video session to the content video session. As one example, if an ad is a pre-roll ad, then events and the video session associated with the ad will be associated or correlated with the next content video session if the content video session is not too far off (e.g., temporally) from the ad events and the ad video session. For example, if an ad has a timestamp indicating that it was played just prior to a particular video content item (e.g., based on timestamp of the end of ad playback is just prior to timestamp of the start of the playback of the requested content), then it may be determined that the ad is a pre-roll ad that is associated with that content item. Thus, comparison of timestamps associated with ad and content playback may be used to determine whether an ad is correlated or associated with content in a particular playback session. In some embodiments, upon determining that an ad is associated with a particular content playback session, the information associated with the ad (e.g., quality information) may be tagged with the <CID, SID> of the unique content playback session.

Correlation based on both identifiers and heuristics may also be performed. As one example, in sports content, multiple parallel video sessions may be played, for example, allowing a viewer to watch multiple games from the same player. While the application level id may be known, the individual session ids for the ads may be different. While the client id can be used to associate ads with content, heuristics such as a timestamp may further be used to determine, at a deeper level of granularity, that an ad is correlated or otherwise connected or matched with a particular session.

In some embodiments, the relationship between correlated ad playback quality data, content playback quality data, and ad metadata is established using foreign keys. As one example, the metrics values and metadata obtained for ads and content may be stored in different tables. The different tables may be related, for example, using client/video session/ad identifiers as foreign keys. For example, in some embodiments, information about ads may be stored to an ad table, and information about content may be stored to a table for content. In some embodiments, the combination of the client identifier and video session identifier is used as the foreign key in a table for ads, indicating that a specific ad is for that particular video session on that particular client. The foreign key made up of the combination of the client identifier and session identifier may be used to link an entry of the ad table to an entry in the table for the content where the metrics and metadata related information of the that video session on that client are stored.

In the above example, correlation is performed on a backend such as platform 202. Correlation may be performed either in the player or at the backend. As one example of correlation being performed on the client, the player deployed on the client may be configured to obtain the ad metadata information from an ad server during a session. The player then correlates the information obtained from the ad server with the ad playback and content playback quality information. The correlated data set (e.g., data sets that are linked by session identifiers or heuristics or any other appropriate correlation technique at the client) may then be sent to a backend such as backend 138 or analysis platform 202 (e.g., to compute metrics, provide dashboards/reports, etc.).

Based on the processing described above, platform 202 is configured to provide various types of output, such as metrics and reports, which will be described in further detail below. For example, metrics may be determined based on the correlation of content quality playback information, advertisement quality playback information, content metadata information (e.g., content name, content type, content genre, etc.), ad metadata information (e.g., ad name, upstream CDN, associated ad agency, associated campaign/rule, etc.), client attribute information, etc.

Metrics

In some embodiments, platform 202 is configured to determine metrics based on the correlation. Three example classes of metrics that may be computed by platform 202 include difference metrics, ad funnel metrics, and ad fatigue metrics which will be described in further detail below.

Difference Metrics

In some embodiments, after correlation of ads and content, differences in the video quality metrics computed for the correlated ad and content, as described above, may then be determined.

In some embodiments, quality/experience difference metrics include consistency metrics for determining consistency between content and ads (e.g., that have been correlated with each other using correlation engine 208). For example, the difference between metrics for content playback and ad playback computed by video metrics processor 204 may be determined (e.g., by subtracting the ad quality playback metric values from corresponding content quality playback metric values, or vice versa).

In some embodiments, the consistency metrics include metrics for the differences in experience or quality metrics between an ad and content, such as the difference in bitrate between an ad and corresponding content, the difference in rebuffering between an ad and content (i.e., difference metrics between ad and content), etc.

In mediums such as television, where, because ads and content are encoded in the same way, there is typically no difference in quality between ads and content. However, in a content distribution environment in which content is delivered over a network such as the Internet, the quality between content and ads may differ based on the manner in which they are encoded, the infrastructure over which they are delivered, etc. (where content and ads may be delivered in different ways from different sources). By determining insights into the impact of ads on content viewing, the difference metrics may be used to improve the quality and experience of online video streaming.

Additional examples of metrics computed based on correlation of ads and content follow.

One example metric is ad consumption per content item. This may include the number of pre-roll or mid-roll ads per content asset (e.g., the number of pre-roll/mid-roll ads played for a particular episode of a show). Another example of ad consumption per content item is the amount of ad play time across content item(s). For example, the number of ad seconds for all basketball games may be determined.

Another example of a metric is resolution/bit-rate mismatch between an ad video and correlated content video. One example of a definition for such a metric is the average bit-rate of the ad played versus the average bit-rate of the content item.

Another example of a metrics that may be defined based on the correlation of ads and content is the buffering ratio difference between the ad video and the content video.

Another example of a metric that may be defined based on the correlation of ads and content is the video failure (rate) for an ad associated with a particular content item.

Another example of a metric that may be defined based on the correlation of ads and content is the video start up time for content associated with a particular ad.

Ad Funnel Metrics

Figure 3:
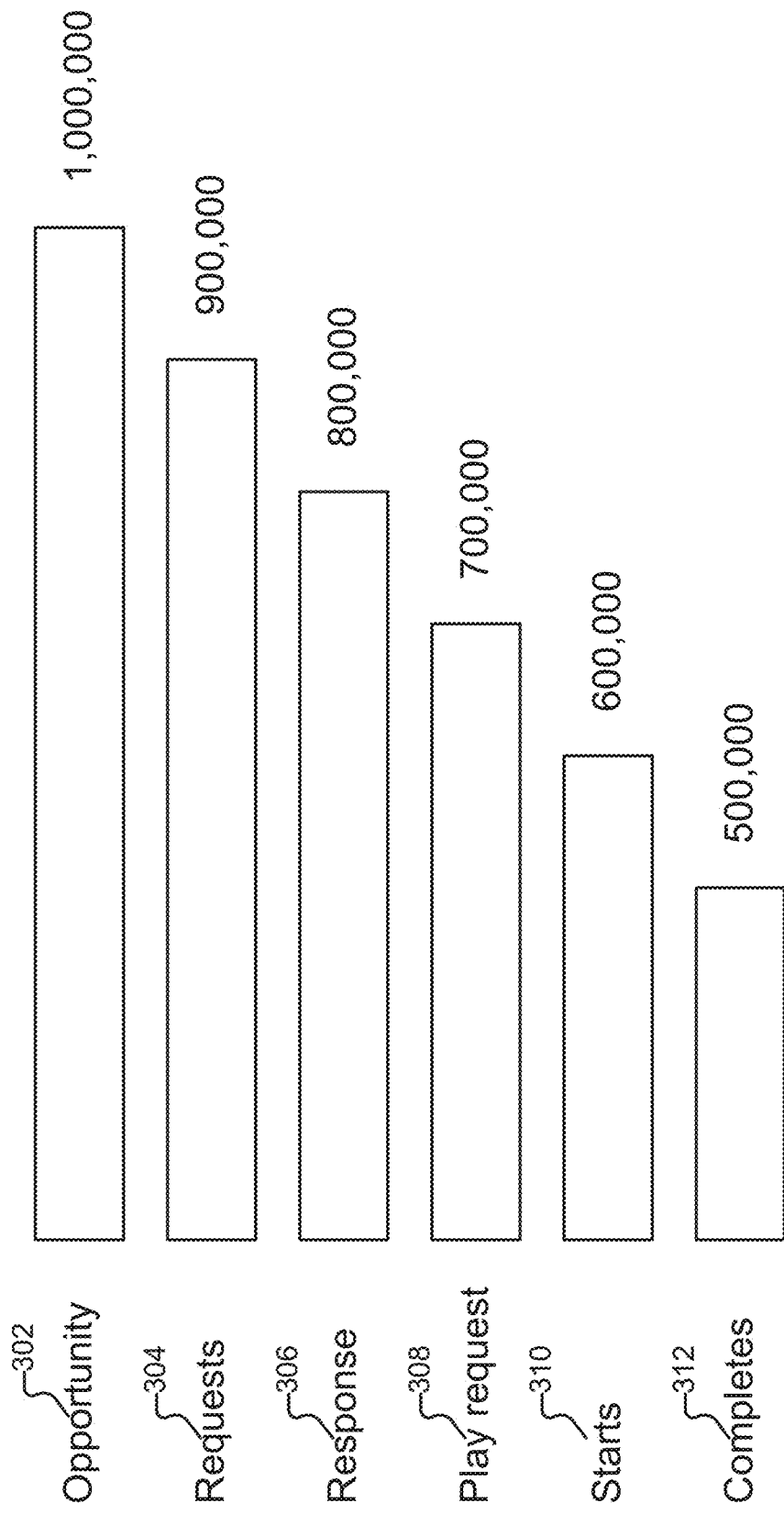
FIG. 3 illustrates an example embodiment of an ad funnel.

Another example class of metrics is ad funnel metrics. FIG. 3 illustrates an example embodiment of an ad funnel. In some embodiments, the ad funnel illustrates the different interactions that are occurring when delivering ads, represented as a funnel from the total opportunity to play ads (top of funnel 302) to what ads were actually completed (bottom of funnel 312). As will be described in further detail below, drops in ads in the funnel may be due to various reasons, such as policies, technical failures, etc., where drops in the ads may represent lost monetization opportunities.

In some embodiments, the total ad opportunity (302) is the number of ads that could have been placed given the total audience that had been available. For example, the platform can determine, for the previous month, the total number of ads that could have been placed given the viewership on the content provider for that month, as well as the ad strategy that was set up by the content provider (e.g., three pre-roll ads, four mid-roll ad breaks with three ads each, etc.). Based on the ad placement/load strategy and the viewership of every viewer that watched a video and how long they watched the video, the total opportunity to place ads for the last month (or any other appropriate period) may be determined. In the example of FIG. 3, there was an opportunity to place one million ads last month given the number of people watching video and the number of ads for which attempts were made to be played per video.

In this example, the measurement of the completed ads 312 is the number of ads that actually completed their viewing. In this example, five hundred thousand ads completed of the one million ads that could have been placed.

In this example, the ad funnel includes various stages between the opportunity and completes. For example, while 500,000 ads completed, in actuality, it is measured (e.g., from raw experience data collected for played ads) that 600,000 ads started (310). Thus, it may be determined that 100,000 ads started, but never finished playing—for example, a viewer abandoned a video stream or session during that ad.

In this example, of the 1,000,000 ads that could have been played, requests (304) for 900,000 ad plays were made to the ad server. Thus, it may be determined that there are 100,000 ads that were not requested, due to, for example, an ad server not receiving request messages for those 100,000 ads (e.g., due to network issues, issues at a client, issues at an ad server, a breakdown between player and server, or other technical issues). In some embodiments, platform 202 is configured to obtain information from an ad server (e.g., ad server 114 of FIGS. 1A and 1B) regarding the number of requests the ad server receives, as well as the number of responses to the requests that were provided. In some embodiments, the ad request/response information is associated with timestamps, which can be used to segment data temporally.

In this example, the responses 306 include the number or count of valid ad responses that players received from the ad server. For example, an ad server may be configured with a policy that specifies that pre-roll ads are not to be played for a particular type of content. In this case, while there was an opportunity to play an ad, due to the policy, an ad was not provided in response to the request. As another example, a response (e.g., URL to ad) may not be provided to a request if there are insufficient ads to play (e.g., the response to the client from the ad server is null)—thus, while there was an opportunity to play an ad and a request to play an ad was received by the ad server, there was no ad to play, and the opportunity to play an ad was lost.

In this example, the play requests 308 indicate the number of requests received by CDNs (e.g., CDNs 128-132 of FIGS. 1A and 1B) to play ads (whose URLs were included in responses to clients). The difference between the CDN play requests and responses may indicate, for example, that while 800,000 responses were provided by the ad server, only 700,000 ad requests were received by ad CDNs from client ad players (e.g., due to client players not receiving the responses for 100,000 ads, requests from the client to the CDN for an actual ad having been dropped, etc.). In this example, the difference between the play requests and starts 310 may indicate the number of ads that failed to start, for example, due to failures at the CDN that prevented the ad from being delivered to a requesting client.

Thus, using raw measurements collected from various entities in the online ad delivery ecosystem, failures or issues in those entities or components in delivering ads may be identified.

Ad Fatigue Metrics

A third example class of metrics that may be determined by platform 202 is referred to herein as "ad fatigue metrics." Even if all ads that were requested or could have been played did indeed play correctly, with consistent high quality and no failures, there may still be an issue with the ad load (e.g., too many ads were played), leading to people abandoning video sessions.

Figure 4:
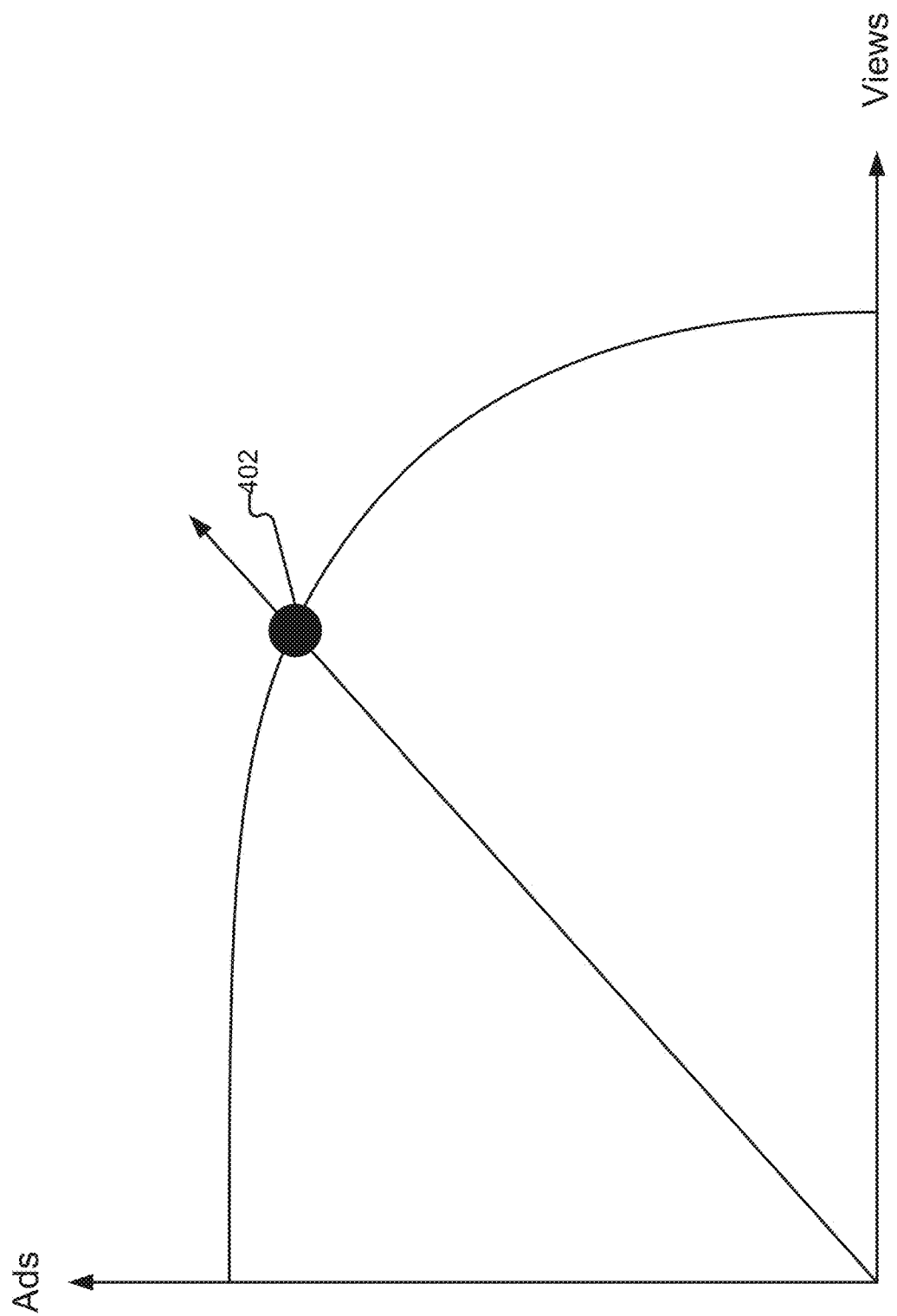
FIG. 4 illustrates an example embodiment of a plot of a number of ads played versus views

FIG. 4 illustrates an example embodiment of a plot of a number of ads played versus views (e.g., the number of viewers that watched content, or the number of content items that were played). The ad load (e.g., number of ads played during ad breaks in content) may impact the number of viewers of content, where there is a tradeoff between the number of ads played and content viewership. For example, if many ads are played, then viewership will decrease, as end users avoid watching content for which a large number of ads are played. Thus, even though many ads are played, ad revenue is low due to fewer viewers watching the ads (where content providers are paid based on the ad being viewed). However, while playing fewer ads may result in more viewers, the playing of fewer ads will result in less ad revenue. Using the raw measurement data collected by platform 202 with respect to content and ads, platform 202 may determine an optimal point 402 between ad load and viewership that maximizes, for example, revenue (i.e., determining an ad load that is associated with a number of viewers that maximizes revenue—more viewers watching more ad load leads to increased revenue). Thus, an optimal ad strategy can be determined that raises the opportunity to play ads.

In some embodiments, the optimal ad load is determined based on metrics and measurements associated with abandonment of video sessions (e.g., closing of a video session due to the user closing a video player, etc.). Abandonment may be analyzed according to various dimensions, such as ad location/position (e.g., pre-roll or mid-roll), type of ad, duration, etc. For example, abandonment rate of video sessions may be analyzed based on the location of the ad. The abandonment rate may also be analyzed based on the duration of an ad break (which may be measured based on the start and stop times for ad breaks obtained from an ad monitor). Thus, for example, platform 202 may determine the abandonment rate of a 120 second duration ad break (which may include multiple ads) versus the abandonment rate for 30 second ad breaks. The drop off in abandonment rate may be determined and in turn used to determine a range of duration within which to maintain a specific ad break/pod load to reduce the abandonment rate for a video session. As another example, using the techniques described herein, for an average video play, the number of ad pods that were actually played may be determined.

In some embodiments, an optimal ad strategy (e.g., ad load—ad break duration, number of ads per ad break, etc.) may be determined based on A/B testing and collecting experience metrics and measurements regarding content and ads associated with the A/B testing.

As one example, an A/B test with different ad loads may be performed, where 50% of sessions had two ads per break, and the remaining 50% of sessions received ad breaks with three ads. The number of ad breaks or pods per play, as well as the number of plays/views are measured and determined. The total number of ads that were played between the two groups are then also determined. These three metrics may then be used to determine abandonment rates for the two ad load strategies. Based on this determination, an optimal ad load (e.g., either two or three ads) may then be determined. In some embodiments, the content provider controls ad playback (e.g., defines the A/B testing groups using rules, policies, etc.), where platform 202 provides analytics to measure the A/B testing (e.g., via an API that provides instructions to platform 202 that allow platform 202 to identify what test groups are being measured).

For example, suppose that based on the A/B testing, it is determined that by playing two ads per break versus three, a 40% increase in viewership is measured. While per play ad opportunity may be lower, the total audience is higher due to more people watching, thereby overcoming or compensating for the fewer ads played per session.

Thus, as described above, A/B testing may be performed to test different ad strategies. As another example, for the same content item, the following strategies may be tested:

(a) have pre-roll ad(s), and have one mid-roll ad
(b) have no pre-roll ad(s), and have three mid-roll ads When facilitating the A/B testing, viewers can be randomly assigned to (a) and (b). The performance metrics regarding ad consumption may then be compared for the two test groups to determine which ad strategy results in better performance.

In some embodiments, ad load strategies may be defined for different contexts, such as different ad strategies for different types of content, different types of devices, different genres, at a per content item granularity, etc. For example, it may be determined that three ads per break is optimal for one show, while two ads per break is optimal for a different show due to different audience sensitivity. In some embodiments, such ad strategy configuration is based at least in part on metadata information (e.g., genre, show, asset title, device type, etc.) collected by platform 202 from content players about views/sessions. Different ad strategies may be determined for different dimensions or combinations of dimensions (e.g., tailor ad strategies for different contexts, such as on a per-view/session basis).

Thus, using the various classes of metrics described above, ad strategies may be optimally adjusted and ad delivery issues may be identified for resolution, improving the consistency of ad delivery, to ultimately maximize the number of ads that are played. Other benefits include an increase in ad monetization as well as improvements in ad inventory management (e.g., determining or forecasting or predicting an appropriate number of ads to maintain in inventory). For example, using the metrics determined by platform 202, changes to rules or ad campaigns may be made. As another example, an identification of faults in ad servers, ad CDNs, etc. may be identified. Failures in specific ads may also be determined (e.g., by determining high buffering for certain ads), allowing such ads to be removed until they are fixed. In some embodiments, alerts may be sent out which identify such failures. Using the ad fatigue metrics and AB testing, policies may be tuned or configured for different contexts, such as different types of content. Various actions may be taken based on the results of the analytics.

Another example of a metric is one that compares expected/planned pod duration versus actual pod duration. For example, while an ad pod may be planned for 90 seconds, it may, in actuality, take 100 seconds to play, for example, due to buffering of ads. By understanding the difference between actual pod duration versus planned duration, improved strategy decisions may be made when determining whether to play the 90 second ad pods. Further, such differences may be flagged, with appropriate administrators notified, so that they can further investigate why the 90 second ad pod is taking 100 seconds to play, and take steps to bring the actual pod time closer to the planned pod time. For example, quality of experience metrics associated with the ads in the ad pod, such as buffering, startup time, etc. can be viewed with the ad pod, and used to determine what caused the longer actual pod time (e.g., due to a particular ad taking 10 seconds to start).

Various dashboards and reports may be provided as output by platform 202 based on the analysis and evaluation described above.

Dashboards and Reports

Based on the processing performed by platform 202, various dashboards and reports may also be generated.

Figure 5A:
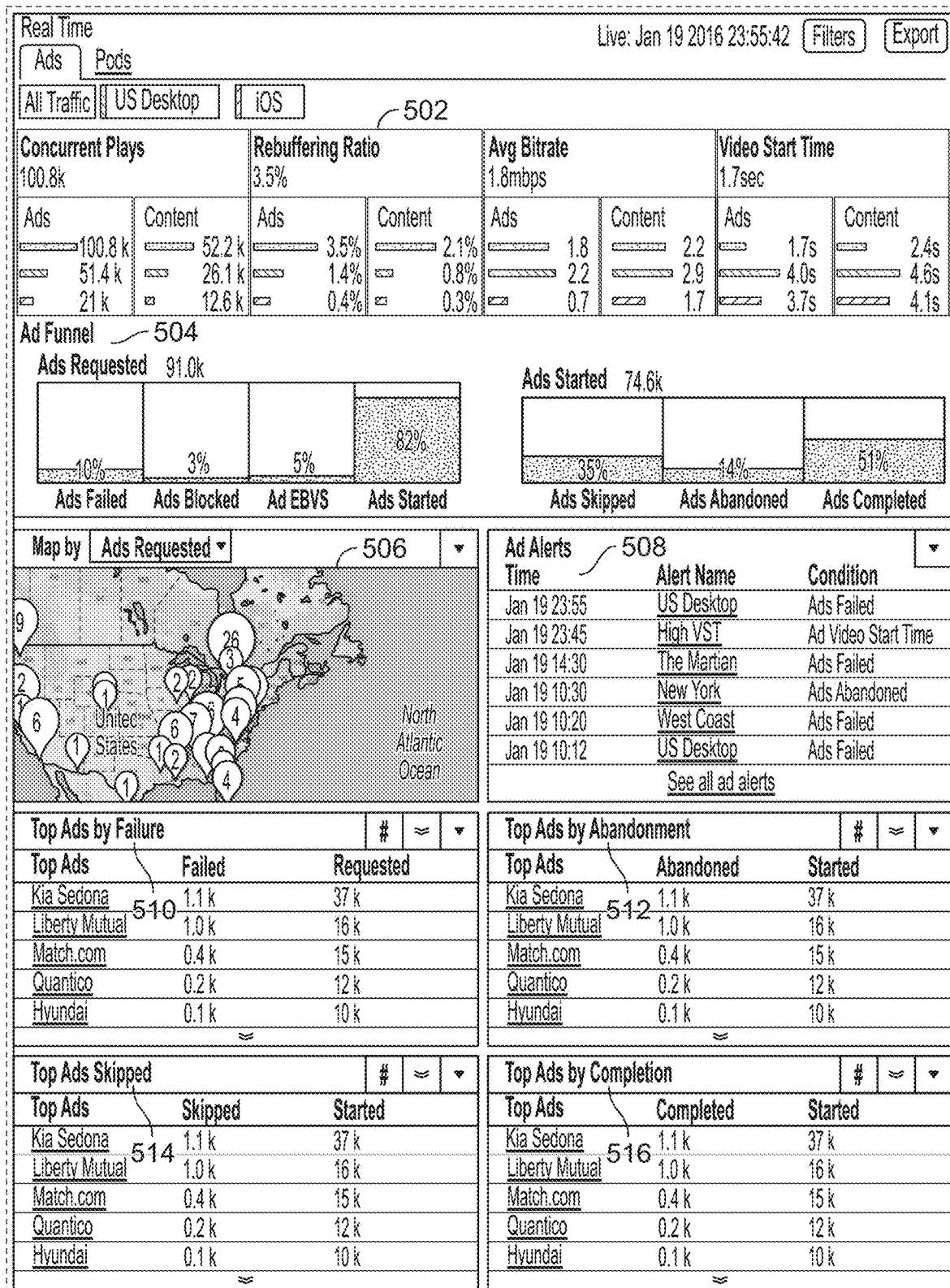
FIG. 5A illustrates an example embodiment of a report for real time ad insights.

FIG. 5A illustrates an example embodiment of a report for real time ad insights. As shown in the example, real time metrics for both ads and content are shown at 502. This includes a side by side comparison of ad and content for quality metrics such as concurrent plays, rebuffering ratio, average bitrate, and video start time. With this interface, a user may easily see how the performance of ads compares with the performance of the content with which the ads are correlated. For each metric, values may be further segmented, for example, by client attributes such as device type (e.g., desktop, iOS, Android, etc.) and region.

At 504, ad funnel metrics are shown. In this example, further detailed information for two portions of the ad funnel (as described in conjunction with FIG. 3) are shown. For example, information regarding ads requested and ads started is shown.

At 506, a map of ads requested is shown. At 508, alerts for ads are shown. The conditions for the alerts, such as that ads failed, high video start times were detected, ads were abandoned, ads were failed, etc., are shown. At 510-516, information about ads that have failed (510), were abandoned (512), skipped (514), and completed (516) is shown. For each of these ad conditions, further details are shown, such as the top ads in each category/condition, as well as associated measures (e.g., counts).

Figure 5B:
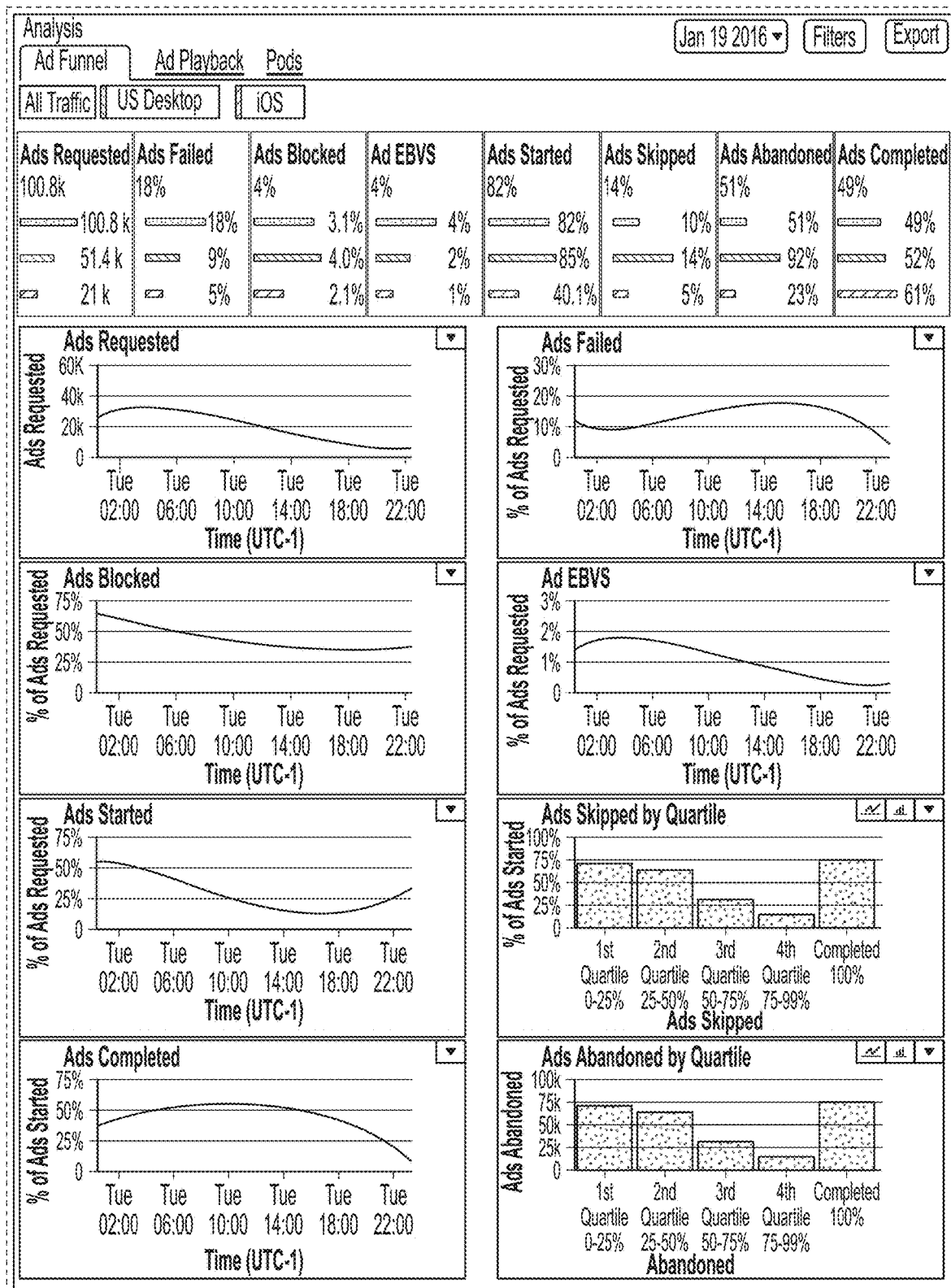
FIG. 5B illustrates an example embodiment of an analysis report.

FIG. 5B illustrates an example embodiment of an analysis report. In the example of FIG. 5B, information associated with ad funnel metrics is shown. Time series plots for various portions of the ad funnel and ad events are shown (e.g., the ads requested over time, and the percentage of ads requested that failed, were blocked, EBVS, started, completed, etc.). Also shown in this example are statistics determined for events observed to have occurred with respect to ads (e.g., ads skipped by quartile, ads abandoned by quartile).

Figure 5C:
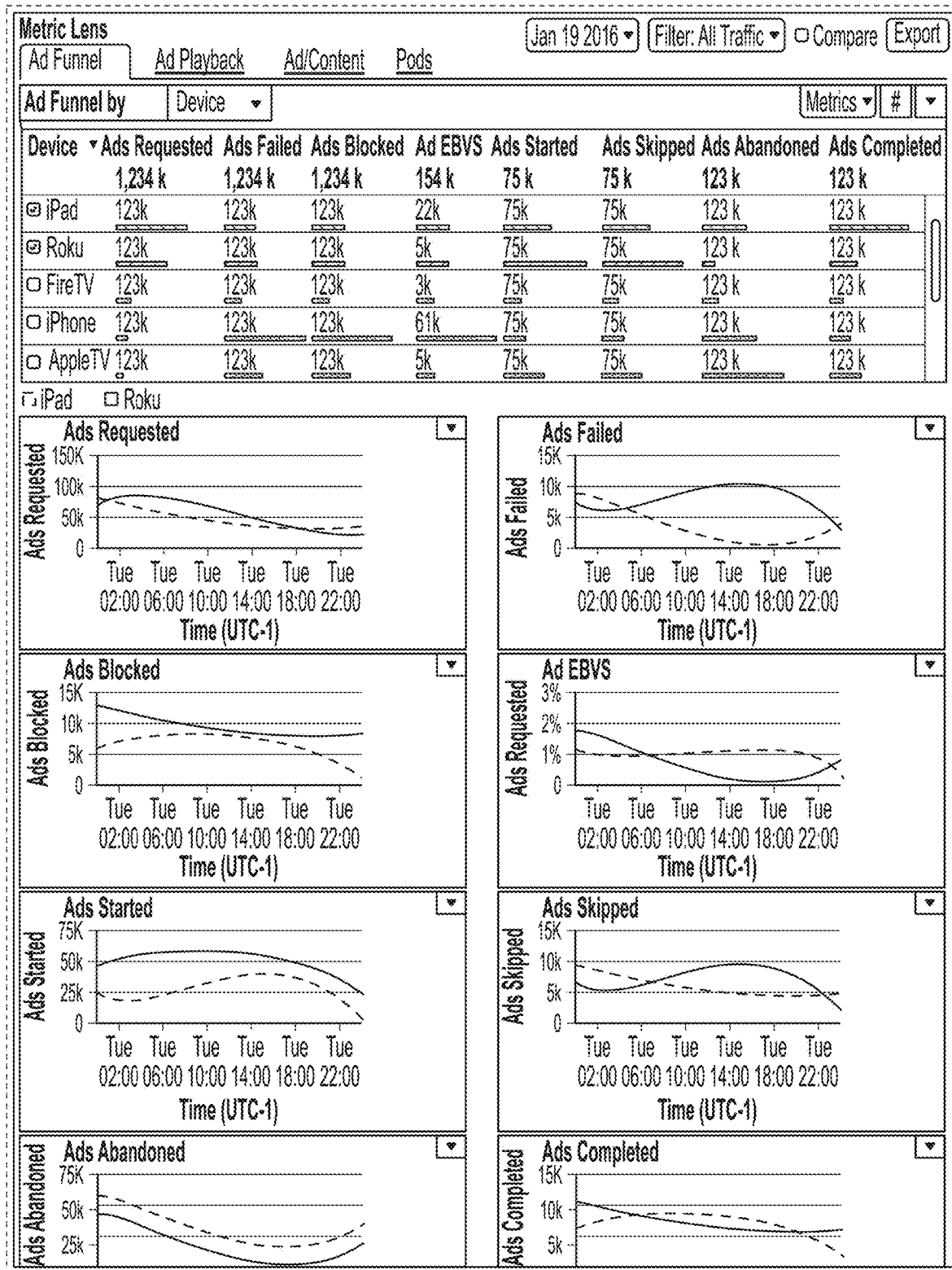
FIG. 5C illustrates an example embodiment of an ad funnel metrics report.

FIG. 5C illustrates an example embodiment of an ad funnel metrics report. In this example, ad funnel metrics are shown. Examples of the computation of ad funnel metrics are described above. The ad funnel metrics may be segmented by dimensions such as device type (which may be included as attributes for the ad information collected from a client application). As shown, the ad funnel metrics include the number or a count of the ads requested, the ads failed, the ads blocked, ad EBVS, ads started, ads skipped, ads abandoned, and ads completed.

Also shown in this example are plots of the ad funnel metrics for the selected device types over time. Such plots allow a user to view a side by side comparison of ad metrics over time for the selected devices.

Figure 5D:
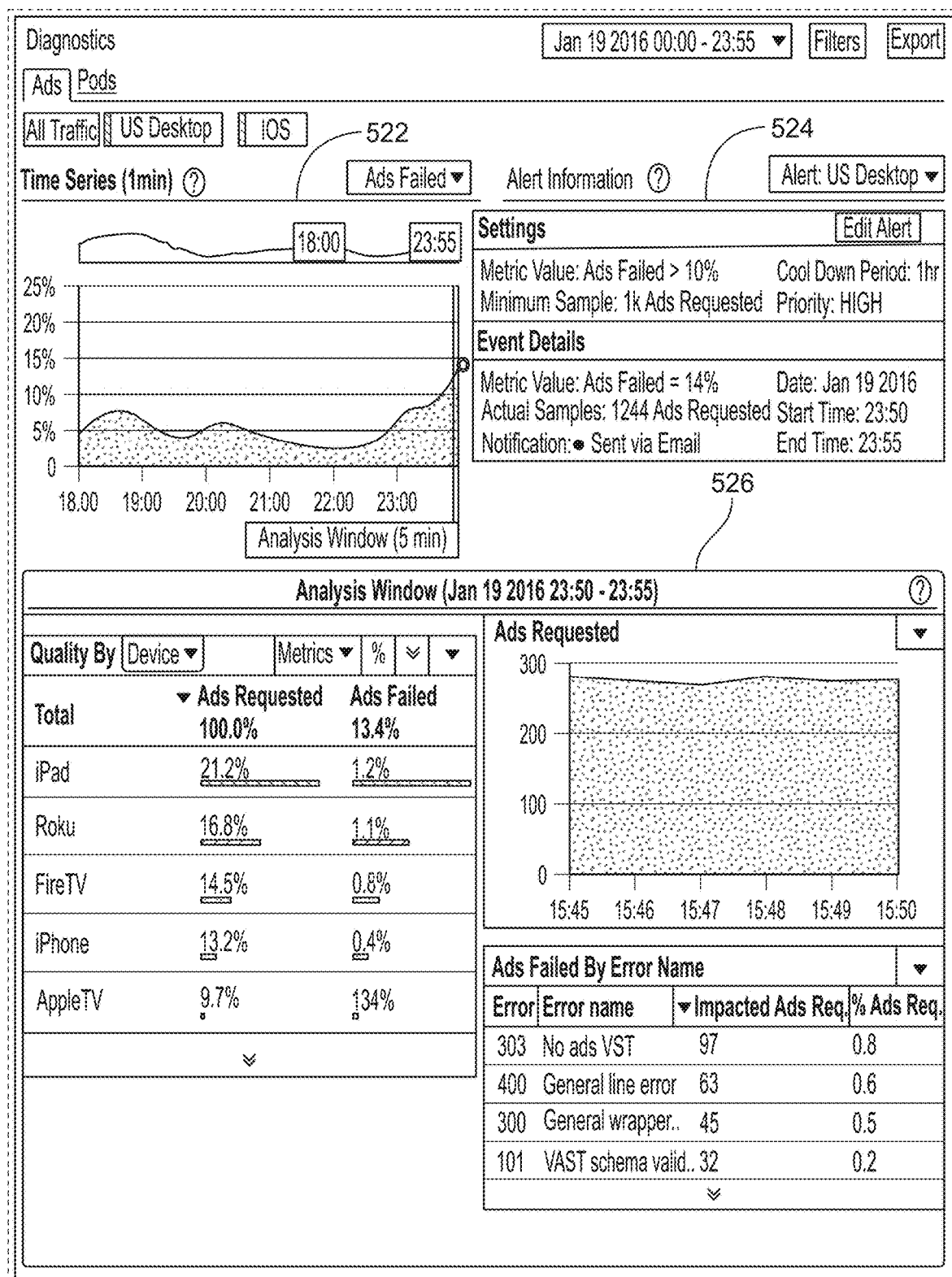
FIG. 5D illustrates an example embodiment of an ad diagnostics report.

FIG. 5D illustrates an example embodiment of an ad diagnostics report. Shown in this example at 522 is a time series plot of the number of ads that failed over time (aggregated at one minute intervals). At 524, alerts are shown. In this example, the alerts are shown for a particular device. Alerts for different segments may be selected for presentation. In the example of 524, the metric (as failed) for which an alert is being sent is shown. The alert was triggered based on a rule, where an alert is triggered if more than a threshold percentage (10% in this example) of ads failed with a certain minimum sample size. The priority for such an alert is also specified, as well as a cool down period.

The event details for an actual event that triggered the alert (based on satisfying the criteria for the rules of the alert) are shown, such as the number or percentage or ratio of ads failed, the number of actual samples, as well as timestamp information. An indication that a notification was sent and via what channel (email in this example) is also shown.

Shown in this example at 526 is a further detailed analysis window for the five minute period in which the observed ad failure triggered the ad failure alert. The quality by different device type is shown. For each device, the percentage of the total ads requested by the device is shown, as well as the percentage of ads that failed on the device. The errors which caused the ad failures and associated measurements are also shown. The ads requested over a period of time are also shown.

FIG. 5E illustrates an example embodiment of an alerts report. In the example shown, nine alerts are shown. Information associated with each alert is shown. The alerts may be for alerts for certain segments of measured data, which may be filtered by dimensions such as device type, content type, geographic region, an ad playback metric condition, etc. The name for the observed segment/type of alert is shown at 532. The filter used to obtain the segment of alerts is shown at column 534. The condition that must be met for an alert to be triggered is also shown for each type of alert at 536. The actual values that met the conditions for triggering the alert are also shown at column 538. The time that an event of the shown type/name occurred is also displayed at 540. Various actions may be taken.

As shown in this example, by correlating information about ads with the content during/for which the ads were played, as well as matching up ad metadata with the quality metrics/measurements made for ads that were played, various ad insights may be determined. For example, at 542, an alert for ads played for the content item with the title "The Martian" is shown. Using the correlation described herein, the quality information for ads that were specifically played along with "The Martian" content type may be identified. The playback measurements/metrics determined for a sample of those ads may then be analyzed to determine whether an alert condition is met. In this example, an alert is sent because, for a ten minute sample, greater than 3% (an example of an alert threshold) of ads failed. Thus, alerts for ads for the specific content item, "The Martian," may then be outputted, indicating that there appears to be an issue with ads that are played with the particular content item.

Client attributes may also be used to further understand ad performance. For example, at 544, a sample of ads played across devices of a specific type (iOS devices in this example) is analyzed to determine whether the percentage of ads that were abandoned exceeds an alert threshold. In this example, because the percentage of abandoned ads for this particular device type exceeded the threshold of 15%, an alert was sent, notifying that there is a high rate of abandonment for ads played on iOS devices. An operator user may then further investigate to determine whether there is an issue, for example, with the encoding or delivery of ads to be played on iOS devices. Thus, by performing the correlations described above, ads may be analyzed and filtered/segmented by various attributes at various levels of granularity.

As described above, data about ads and content may be obtained from three sources, including a video player, an ad player, and an ad server. Using the techniques described herein, the ability to measure from both ends (ad server and client) of an active playback session is provided, where the data sets obtained from the client and ad server may be correlated by integrating them together using the techniques described herein.

Figure 6A:
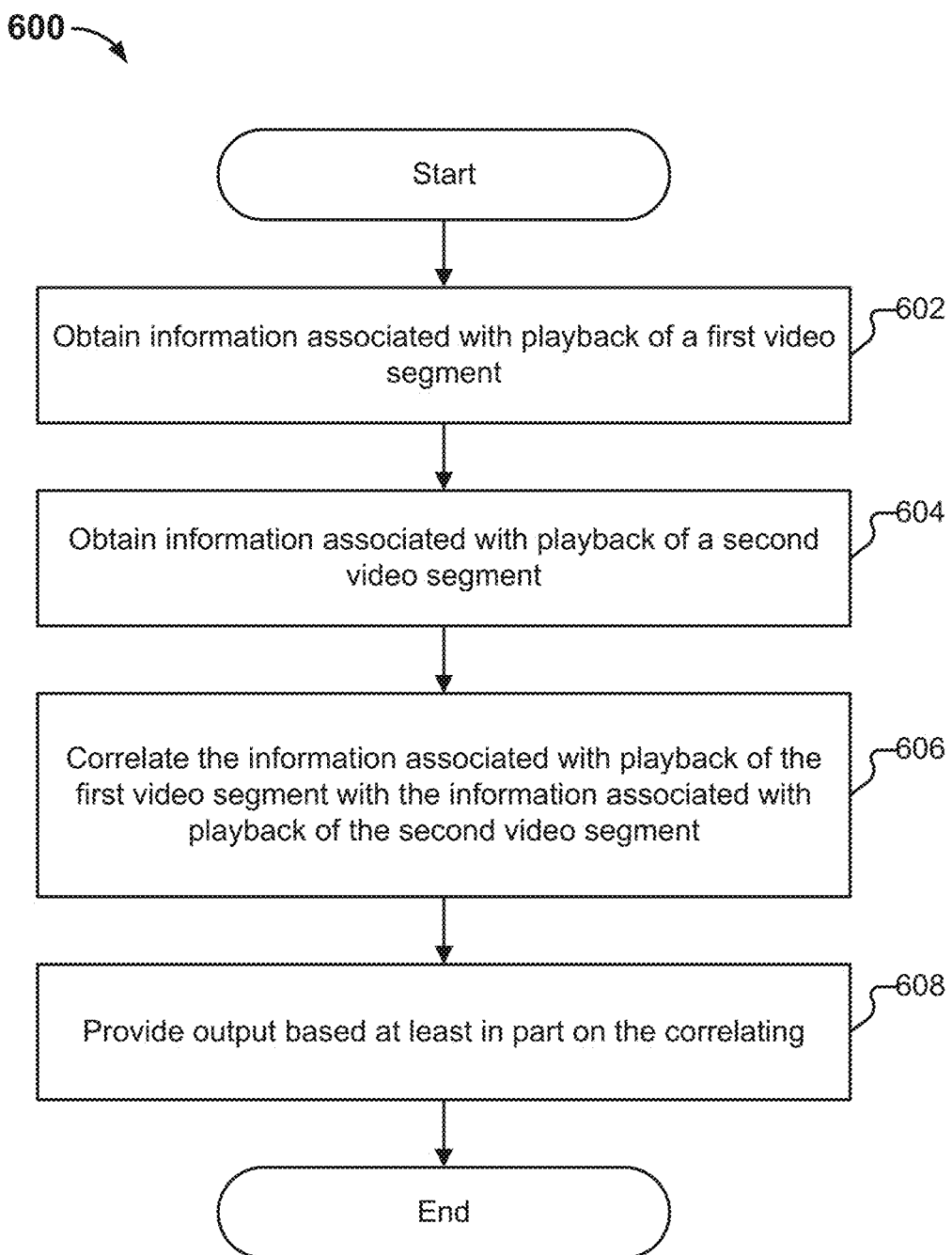
FIG. 6A is a flow diagram illustrating an embodiment of a process for correlating playback information of video segments.

FIG. 6A is a flow diagram illustrating an embodiment of a process for correlating playback information of video segments. In some embodiments, process 600 is executed by platform 202 of FIG. 2. In other embodiments, process 600 is executed by client 104 of FIGS. 1A and 1B. The process begins at 602 when information associated with playback of a first video segment is obtained. At 604, information associated with playback of a second video segment is obtained. In some embodiments, the first video segment is an advertisement that is played with a video session. In some embodiments, the second video segment is a content item requested by a user for which the video session is created. The playback information may be obtained from content player applications on clients. In some embodiments, the playback information includes playback information such as metrics computed from raw measurement data provided by the content player(s) playing the ad and content (or a monitoring engine configured to make the measurements). The quality playback information may also include event information (e.g., indications of failure events). As another example, the playback information may include engagement information such as a length of time that the video segment has been playing, a length of time that the client has been connected to a content distribution network, an amount of data associated with a download of the video segment, a display mode of a video screen, a viewer interaction with at least one player control, and a viewer interaction with the video segment.

At 606, the information associated with playback of the first video segment item is correlated with the information associated with playback of the second video segment. For example, in some embodiments, the correlation of the advertisement and the content item is based on identifiers such as client application identifiers and/or session identifiers. As described above, the information associated with the content playback and advertisement playback may be tagged with a combination of client identifier (CID) (e.g., client application instance identifier) and session identifier (SID), which uniquely identifies a content playback session on a particular client. The correlation may also be performed using heuristics such as timestamps. For example, if an ad is determined, based on timestamps, to have finished just prior to the start of a particular content item (where the start time for the content item is recorded), it may be inferred that the ad is a pre-roll ad for the content playback session. Thus, the ad is correlated with the particular playback session and content item. The information associated with both the playback of the content and the ad may be tagged with the same combination of CID and SID upon determining that the ad is associated or connected with (e.g., was played for) the video session playing on the client. In some embodiments, correlating the ad and the requested content item includes associating an identifier of the session in which the content was played with an identifier of the advertisement that is determined to have been played in connection with that content playback session.

At 608, output is provided based on the correlating. In some embodiments, if the correlating is performed by the client, then the correlated information is packaged and sent together to an analysis platform such as platform 202 for further processing. One example output is difference metrics. For example, the difference between metrics computed for each of the ad and the content item, which have now been correlated, may be determined. As another example, the metrics computed for ads and correlated content items may be displayed side by side, allowing a user to compare the quality of content and the quality of the ads that were played with the content. A comparison of engagement between the video segments may also be facilitated by displaying correlated engagement measures side by side. Other examples of output are as described above.

Figure 6B:
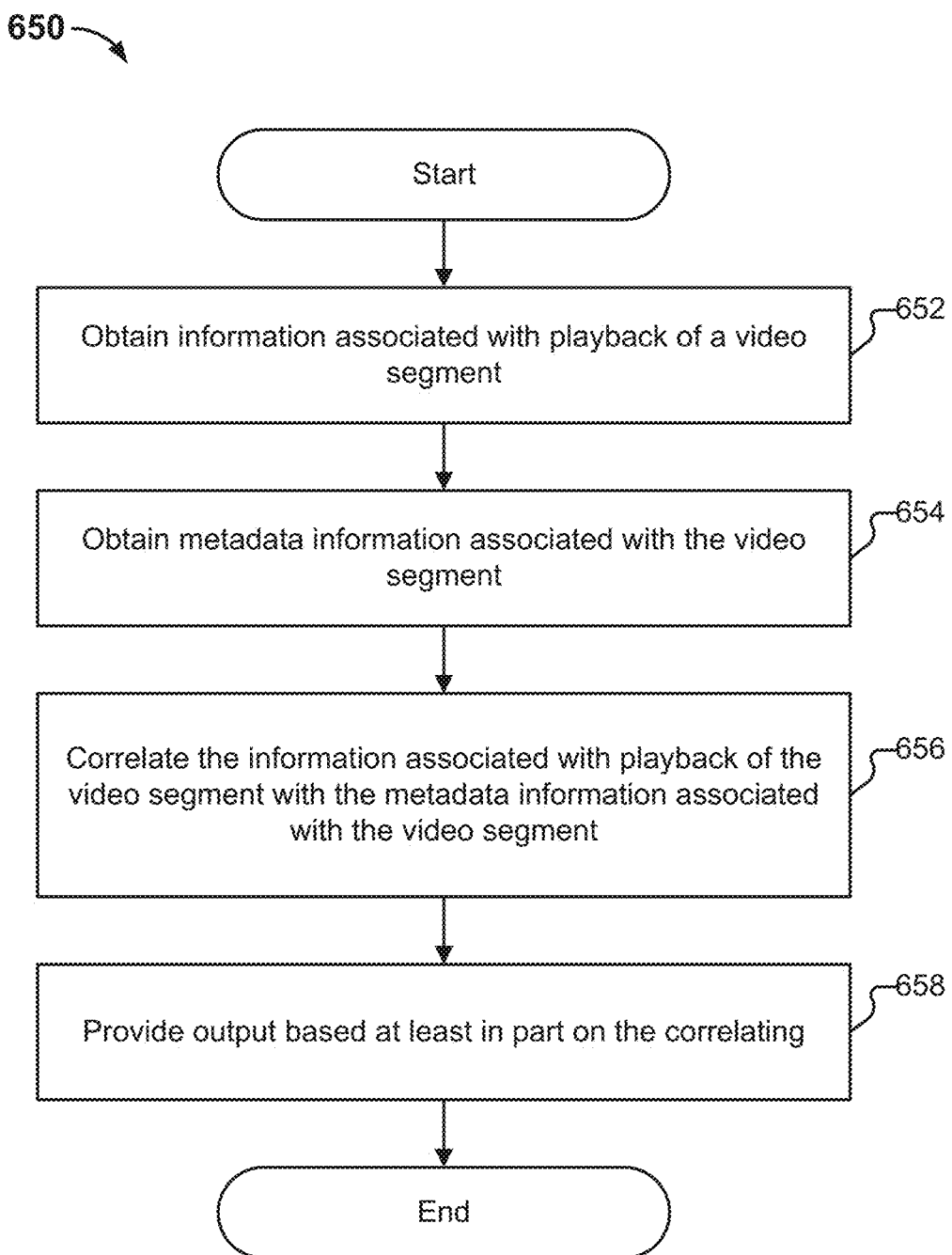
FIG. 6B is a flow diagram illustrating an embodiment of a process for correlating video segment playback information and metadata information.

FIG. 6B is a flow diagram illustrating an embodiment of a process for correlating video segment playback information and metadata information. In some embodiments, process 650 is executed by platform 202 of FIG. 2. In other embodiments, process 650 is executed by client 104 of FIGS. 1A and 1B. The process begins at 652 when information associated with playback of a video segment is obtained. The playback information that is obtained may include quality information, engagement information, etc. associated with the video segment, as described above. In some embodiments, the video segment is an advertisement.

At 654, metadata information associated with the video segment is obtained. For example, in the case of client-side ad insertion, the client, which inserts ad segments into the video stream, may extract an ad identifier from a URL string used to obtain a chunk of the advertisement. As another example, the ad identifier is obtained from a cue point. In some embodiments, the metadata information is obtained by querying a remote data store (e.g., remote ad server) using the obtained ad identifier. Metadata information corresponding to the ad identifier is obtained in response to the query. In various embodiments, the metadata information includes the upstream ad server, an associated campaign, any policies or rules associated with the advertisement, etc.

In the case of server side ad insertion, the client may not know what ads were played during the session (where the client may not have direct access to ad identifiers). The identity of what ads were played for a given session may be known by the ad insertion server, which inserted the ads into the video stream for that session. In some embodiments, to determine what ads were played for that session, the session identifier is obtained. The ad insertion server is queried using the session identifier. The identifiers of the ads that were played for that session are obtained. The ad insertion server may also return metadata information associated with the ads. If not, then the ad identifiers may be used to make additional queries to another entity such as an ad server to obtain ad metadata information.

At 656, the information associated with playback of the video segment is correlated with the obtained metadata information. In some embodiments, as described above, a particular ad (e.g., with a particular creative name) may be associated with a corresponding set of playback measurements based, for example, on the ad identifier used to obtain, from the ad server, the metadata about the ad that was played. In some embodiments, user behavior/engagement information (e.g., whether a viewer skipped an ad, abandoned the ad, etc.) is obtained and correlated or otherwise associated with the ad metadata (e.g., tied together with the same ad, session, and/or client application identifier). Other ad information, such as ad location/placement relative to requested content (e.g., pre-roll or mid-roll ad), ad playback duration (e.g., number of seconds or minutes that advertisement was played), ad break (that advertisement was included in) size/duration, etc. may also be collected and correlated. Pod level information may also be collected and correlated. Based on the correlation, metadata information about an ad that is obtained from a source external to a client may be connected with the information about the ad that is collected by the client.

At 658, output is provided based on the correlating. In some embodiments, if the correlating is performed by the client, then the correlated information is packaged and sent together to an analysis platform such as platform 202 for further processing. As one example of the output that may be provided based on the correlation, the information may be segmented by different metadata dimensions to perform analysis and determine ad insights. In some embodiments, new metrics may be computed based on the correlation, such as failure rate (example of a quality metric) by campaign, failure rate by ad server, or any other ad metadata attribute, as appropriate. As another example, user engagement/behavior with respect to certain ads or campaigns may be determined (e.g., higher abandonment when a particular ad was played). Other examples of output that may be provided include ad fatigue, and load, and ad funnel metrics as described above. In some embodiments, alerts may be sent out based on an analysis of samples of ad performance information (which may be further segmented by client attributes, correlated ad metadata attributes, correlated content metadata attributes, etc.), as shown in the example of FIG. 5E.

As described above, content playback information may be correlated with playback information of ads determined to have been played for the content item (e.g., identifying what ads were played for what content using identifiers and/or heuristics). playback information for the ad may also be correlated with metadata information about the ad that is obtained from a source that is different from the source of the ad playback information. In some embodiments, the content playback information is also correlated with ad metadata. As one example, for a content item, the sessions in which the content item was played are identified. For each of the sessions, the identifiers of the ads determined to have been correlated or played for the session are obtained. The identifiers may be used to obtain metadata about the identified ads. Various processing may then be performed on information about the content played during the session along with the metadata information about the ads played during the session.

As another example, metadata about the content item (e.g., content name, season/episode number, publisher, genre, etc.) is obtained. The content metadata may then be used to segment ad metadata to determine, for example, the names of the ads that were played for a particular content item (e.g., what ads were played during a particular show). As another example, all ads of a brand that were played across all content that was played may be determined and analyzed. Content/ad playback information may also be segmented by other attributes, such as client attributes (e.g., device type, iOS, user agent, geolocation/geographic region, IP address, etc.).

Thus, by integrating information from various sources (e.g., content and ad playback information from a content player and ad metadata from a remote ad server) into a single location (e.g., backend 202), where the information may be correlated at the backend or at a client/content player, various analytics and insights may be determined based on a determination of what ads were played with what content (e.g., what ads are correlated with what content) and what ads for which measurements have been made (e.g., what ad metadata is correlated with what ad playback measurements).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
obtain playback information associated with playback, on a client device, of a segment of a video content item requested by a user;
assign the playback information associated with playback of the segment of the video content item requested by the user with a combination of a client application instance identifier and a video session identifier;
obtain playback information associated with playback, on the client device, of a segment of a video advertisement;
determine that playback of the video advertisement is associated with playback of the video content item requested by the user;
in response to determining that playback of the video advertisement is associated with playback of the video content item requested by the user, correlate the playback information associated with playback of the segment of the video content item with the playback information associated with playback of the segment of the video advertisement at least in part by assigning, to the playback information associated with playback of the segment of the video advertisement, the same combination of the client application instance identifier and the video session identifier assigned to the playback information associated with the segment of the video content item requested by the user; and
provide output based at least in part on the correlating; and
a memory coupled to the processor and configured to provide the processor with instructions.

2. The system of claim 1, wherein the playback information associated with playback of the segment of the video content item and the segment of the video advertisement includes quality information comprising at least one of bitrate information, buffering information, rendering information, failure event information, and connection information.

3. The system of claim 1, wherein the playback information associated with playback of the segment of the video content item and segment of the video advertisement includes engagement information comprising at least one of a length of time that a video segment has been playing, a length of time that a client has been connected to a content distribution network, an amount of data associated with a download of the video segment, a display mode of a video screen, a viewer interaction with at least one player control, and a viewer interaction with the video segment.

4. The system of claim 1, wherein the processor is further configured to determine one or more metrics based at least in part on the correlating.

5. The system of claim 4, wherein the one or more metrics determined based at least in part on the correlating are associated with a difference in playback quality between the segment of the video content item and the segment of the video advertisement.

6. The system of claim 4, wherein the one or more metrics determined based at least in part on the correlating are associated with at least one of advertisement consumption per content item, resolution mismatch between the segment of the video content item and the segment of the video advertisement, a difference in buffering ratio between the segment of the video content item and the segment of the video advertisement, a video failure for the segment of the video content item correlated with the segment of the video advertisement, and video start up time for the segment of the video advertisement correlated with the segment of the video content item.

7. The system of claim 1, wherein subsequent to the correlating, the processor is further configured to display the information associated with playback of the segment of the video content item with the correlated information associated with playback of the segment of the video advertisement.

8. The system of claim 1, wherein the processor is further configured to determine that playback of the segment of the video content item and playback of the segment of the video advertisement are associated with a same video session on the client device.

9. The system of claim 8, wherein the processor is configured to correlate the playback information associated with playback of the segment of the video content item with the playback information associated with playback of the segment of the video advertisement in response to determining that playback of the segment of the video content item and playback of the segment of the video advertisement are associated with a same video session on the client device.

10. The system of claim 8, wherein the processor is configured to determine that playback of the segment of the video content item and playback of the segment of the video advertisement are associated with the same video session on the client device based at least in part on an evaluation of a timestamp associated with playback of the segment of the video content item and a timestamp associated with playback of the segment of the video advertisement.

11. A method, comprising:
obtaining playback information associated with playback, on a client device, of a segment of a video content item requested by a user;
assigning the playback information associated with playback of the segment of the video content item requested by the user with a combination of a client application instance identifier and a video session identifier;
obtaining playback information associated with playback, on a client device, of a segment of a video advertisement;
determining that playback of the video advertisement is associated with playback of the video content item requested by the user;
in response to determining that playback of the video advertisement is associated with playback of the video content item requested by the user, correlating, using one or more processors, the playback information associated with playback of the segment of the video content item with the playback information associated with playback of the segment of the video advertisement at least in part by assigning, to the playback information associated with playback of the segment of the video advertisement, the same combination of the client application instance identifier and the video session identifier assigned to the playback information associated with the segment of the video content item requested by the user; and providing output based at least in part on the correlating.

12. A system, comprising:
a processor configured to:
obtain playback information associated with playback of a segment of a video advertisement;
assign the playback information associated with playback of the segment of the video advertisement with a combination of a client application instance identifier and a video session identifier;
obtain metadata information associated with the segment of the video advertisement, wherein the metadata information is obtained based at least in part on an identifier associated with the segment of the video advertisement, and wherein the metadata information is obtained from a source different from a source from which the playback information is obtained;
correlate the obtained playback information associated with playback of the segment of the video advertisement with the obtained metadata information at least in part by assigning, to the obtained metadata information, the same combination of the client application instance identifier and the video session identifier assigned to the playback information associated with playback of the segment of the video advertisement; and
provide output based at least in part on the correlating; and
a memory coupled to the processor and configured to provide the processor with instructions.

13. The system of claim 12, wherein the information associated with playback of the segment of the video advertisement is obtained from a content player and the metadata information is obtained from a remote server.

14. The system of claim 13, wherein the metadata information associated with the segment of the video advertisement is obtained at least in part by querying the remote server.

15. The system of claim 14, wherein the processor is further configured to query the remote server using the identifier associated with the segment of the video advertisement.

16. The system of claim 15, wherein the identifier associated with the segment of the video advertisement is derived from a uniform resource locator (URL) associated with the segment of the video advertisement.

17. The system of claim 15, wherein the identifier associated with the segment of the video advertisement is obtained from a cue point.

18. The system of claim 13, wherein the system comprises the client device including the content player, and wherein:

the client device is configured to obtain the metadata information from the remote server during a content playback session;
the client device is configured to perform the correlating; and
the output based at least in part on the correlating is transmitted to a remote analysis platform.

19. The system of claim 12, wherein the playback information associated with playback of the segment of the video advertisement comprises quality information including at least one of bitrate information, buffering information, rendering information, failure event information, and connection information.

20. The system of claim 12 wherein the playback information associated with playback of the segment of the video advertisement includes engagement information comprising at least one of a length of time that the segment of the video advertisement has been playing, a length of time that a client has been connected to a content distribution network, an amount of data associated with a download of the segment of the video advertisement, a display mode of a video screen, a viewer interaction with at least one player control, and a viewer interaction with the segment of the video advertisement.

21. The system of claim 12, wherein the metadata information associated with the segment of the video advertisement includes at least one of an associated creative name, an associated campaign, a policy associated with the campaign, a rule associated with the campaign, an upstream content delivery network (CDN), and an associated agency CDN.

22. The system of claim 12, wherein the processor is further configured to determine at least one of a playback duration of the segment of the video advertisement and a position in which the segment of the video advertisement was played relative to another video segment.

23. A method, comprising:
obtaining playback information associated with playback of a segment of a video advertisement;
assigning the playback information associated with playback of the segment of the video advertisement with a combination of a client application instance identifier and a video session identifier;
obtaining metadata information associated with the segment of the video advertisement, wherein the metadata information is obtained based at least in part on an identifier associated with the segment of the video advertisement, and wherein the metadata information is obtained from a source different from a source from which the playback information is obtained;
correlating, using a processor, the obtained playback information associated with playback of the segment of the video advertisement with the obtained metadata information at least in part by assigning, to the obtained metadata information, the same combination of the client application instance identifier and the video session identifier assigned to the playback information associated with playback of the segment of the video advertisement; and
providing output based at least in part on the correlating.

* * * * *